United States Patent
Yasuda et al.

(10) Patent No.: US 9,312,729 B2
(45) Date of Patent: Apr. 12, 2016

(54) CONTACTLESS POWER TRANSFER APPARATUS

(75) Inventors: Tomio Yasuda, Saitama (JP); Hiroyuki Kishi, Tokyo (JP); Shigeru Abe, Saitama (JP); Akira Suzuki, Aichi (JP)

(73) Assignees: TECHNOVA INC., Tokyo (JP); NATIONAL UNIVERSITY CORPORATION SAITAMA UNIVERSITY, Saitama (JP)

( * ) Notice: Subject to any disclaimer, the term of this patent is extended or adjusted under 35 U.S.C. 154(b) by 417 days.

(21) Appl. No.: 13/979,820

(22) PCT Filed: Jan. 18, 2012

(86) PCT No.: PCT/JP2012/050969
§ 371 (c)(1),
(2), (4) Date: Aug. 15, 2013

(87) PCT Pub. No.: WO2012/099170
PCT Pub. Date: Jul. 26, 2012

(65) Prior Publication Data
US 2014/0084697 A1    Mar. 27, 2014

(30) Foreign Application Priority Data

Jan. 19, 2011  (JP) ................................ 2011-009300
Mar. 24, 2011  (JP) ................................ 2011-065899
Sep. 5, 2011   (JP) ................................ 2011-192590

(51) Int. Cl.
H01F 27/42    (2006.01)
H01F 37/00    (2006.01)
(Continued)

(52) U.S. Cl.
CPC ............. *H02J 17/00* (2013.01); *B60L 11/182* (2013.01); *B60L 11/1824* (2013.01); *H01F 3/10* (2013.01);
(Continued)

(58) Field of Classification Search
CPC ........... H02J 5/005; H02J 7/025; H02J 17/00; H01F 38/14
USPC ......................................................... 307/104
See application file for complete search history.

(56) References Cited

U.S. PATENT DOCUMENTS 5,684,380 A    11/1997  Woody et al.
5,808,537 A    9/1998   Kondo et al.
(Continued)

FOREIGN PATENT DOCUMENTS

CN    101383215 A    3/2009
JP    6-225482 A     8/1994
(Continued)

OTHER PUBLICATIONS

International Search Report mailed May 1, 2012 in PCT/JP2012/050969.
(Continued)

*Primary Examiner* — Carlos Amaya
(74) *Attorney, Agent, or Firm* — Rothwell, Figg, Ernst & Manbeck, P.C.

(57) ABSTRACT

A contactless power transfer core used for a power transmission coil or a power reception coil of a contactless power transfer apparatus includes: a winding core part wound by an electric wire; and a magnetic pole core part constituting a magnetic pole portion provided at both sides of the winding core part. A height of the uppermost part of a ferrite plate arranged on a face of the magnetic pole core part at a side opposing a counterpart coil is equal to or greater than a height of an outer circumference of the electric wire wound around the winding core part, and a height of the ferrite plate of a face at a side not opposing the counterpart coil is lower than the height of the outer circumference of the electric wire wound around the winding core.

19 Claims, 23 Drawing Sheets

(51) Int. Cl.
*H01F 38/00* (2006.01)
*H02J 17/00* (2006.01)
*B60L 11/18* (2006.01)
*H01F 38/14* (2006.01)
*H01F 3/10* (2006.01)
*B60M 7/00* (2006.01)
*H02J 5/00* (2006.01)
*H02J 7/02* (2006.01)

(52) U.S. Cl.
CPC ............ *H01F 38/14* (2013.01); *B60L 2210/30* (2013.01); *B60L 2210/40* (2013.01); *B60L 2240/36* (2013.01); *B60M 7/003* (2013.01); *H01F 2003/106* (2013.01); *H02J 5/005* (2013.01); *H02J 7/025* (2013.01); *Y02T 10/7005* (2013.01); *Y02T 10/7241* (2013.01); *Y02T 90/12* (2013.01); *Y02T 90/121* (2013.01); *Y02T 90/122* (2013.01); *Y02T 90/127* (2013.01); *Y02T 90/14* (2013.01)

(56) References Cited

U.S. PATENT DOCUMENTS

| | | | |
|---|---|---|---|
| 6,049,191 | A | 4/2000 | Terazoe et al. |
| 7,852,184 | B2 | 12/2010 | Yamazaki et al. |
| 2008/0265684 | A1* | 10/2008 | Farkas .................. B60L 11/005 307/104 |
| 2008/0297295 | A1 | 12/2008 | Yamazaki et al. |
| 2010/0065352 | A1 | 3/2010 | Ichikawa |

FOREIGN PATENT DOCUMENTS

| | | | |
|---|---|---|---|
| JP | 8-205432 | A | 8/1996 |
| JP | 9-266121 | A | 10/1997 |
| JP | 10-94104 | A | 4/1998 |
| JP | 10-170172 | A | 6/1998 |
| JP | 10-191572 | A | 7/1998 |
| JP | 11-238638 | A | 8/1999 |
| JP | 2003-158027 | A | 5/2003 |
| JP | 2008-87733 | A | 4/2008 |
| JP | 2009-231495 | A | 10/2009 |
| JP | 2010-172084 | A | 8/2010 |
| JP | 2011-50127 | A | 3/2011 |
| WO | 2009/031639 | A1 | 3/2009 |

OTHER PUBLICATIONS

Communication pursuant to Rule 164(1) EPC and Supplemental Partial European Search Report mailed Feb. 9, 2016 in corresponding EP Patent Application No. 12736387.7 (7 pages).

* cited by examiner

FIG.1A
FIG.1C
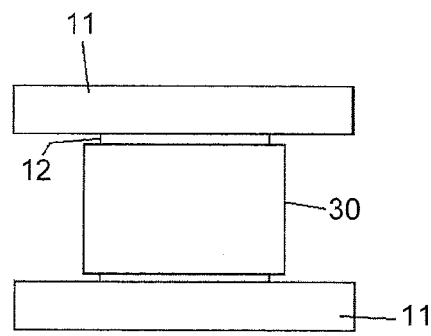
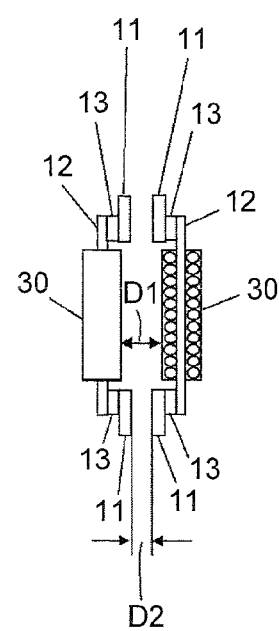
FIG.1B
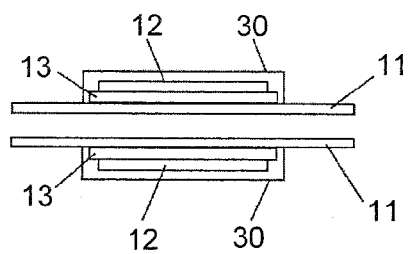
FIG.2A
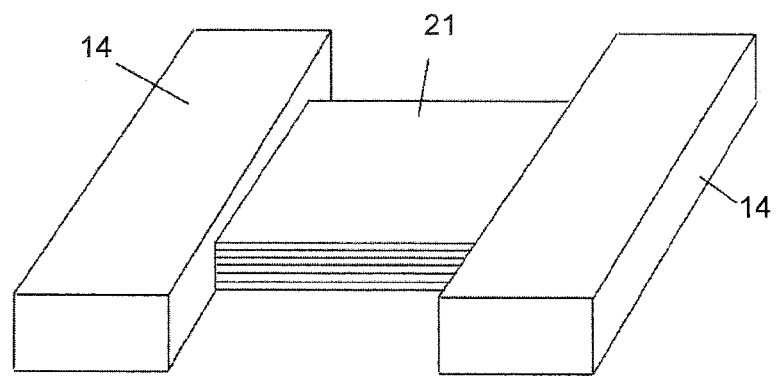
FIG.2B
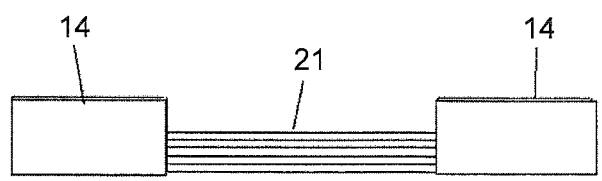

| MEASURED DATE | 5/19 | | 7/14 | | | |
|---|---|---|---|---|---|---|
| TRANSFORMER | FERRITE CORE | | AMORPHOUS CORE | | | |
| MECHANICAL GAP [mm] | 70[1] | | 80[1] | | | |
| MAGNETIC GAP [mm] | 80 | | 80 | | | |
| NUMBER OF WINDING | 24 | | 24 | | | |
| | 9 | | 9 | | | |
| FREQUENCY [kHz] | 20 | 30 | 10 | 15 | 20 | 30 |
| $r_0$ [mΩ] | -11.6 | -11.9 | 73.7 | 168 | 292 | 629 |
| ERROR OF $r_0$ [%] | 29.1 | 28.5 | 0.60 | 0.16 | 0.15 | 0.42 |
| $r_1$ [mΩ] | 119 | 146 | 143 | 206 | 290 | 498 |
| $r_2$ [mΩ] | 16.5 | 20.4 | 24.6 | 36.0 | 50.6 | 88.5 |
| $l_0$ [μH] | 76.0 | 76.1 | 72.7 | 72.6 | 72.5 | 71.9 |
| $l_1$ [μH] | 138 | 138 | 141 | 141 | 141 | 141 |
| $l_2$ [μH] | 19.8 | 19.8 | 20.9 | 20.9 | 20.7 | 20.7 |
| $L_1$ [μH] | 214 | 214 | 214 | 214 | 213 | 213 |
| $L_2$ [μH] | 30.5 | 30.5 | 31.1 | 31.1 | 30.9 | 30.8 |
| k | 0.353 | 0.353 | 0.334 | 0.334 | 0.335 | 0.333 |
| b | 0.350 | 0.351 | 0.328 | 0.328 | 0.330 | 0.329 |
| $R_{Lnzu}$ [Ω] | 11.6 | 17.4 | 5.73 | 8.53 | 11.3 | 16.7 |
| $\eta_{nzu}$ [%] | 97.4 | 97.9 | 93.1 | 93.3 | 93.0 | 91.9 |

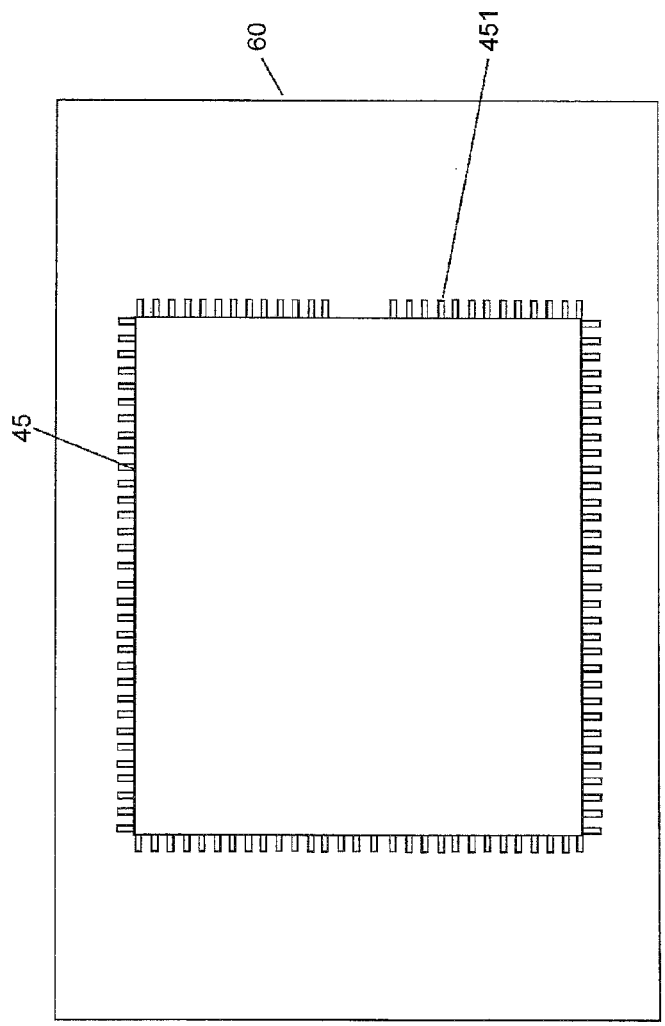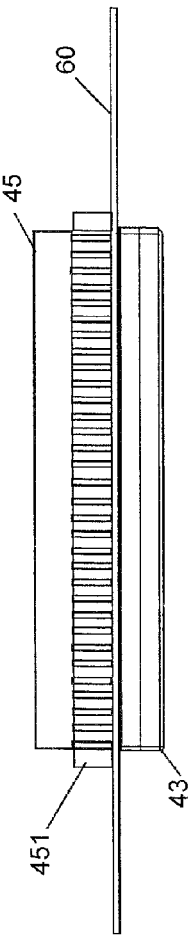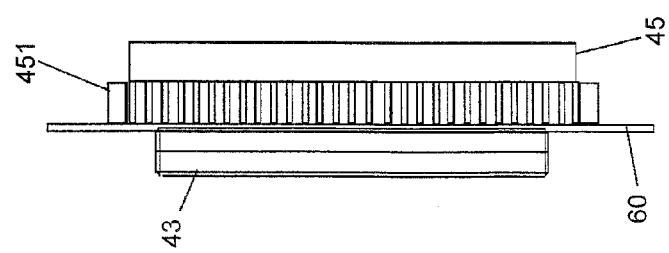
FIG.24A
FIG.24B
FIG.24C

FIG.27
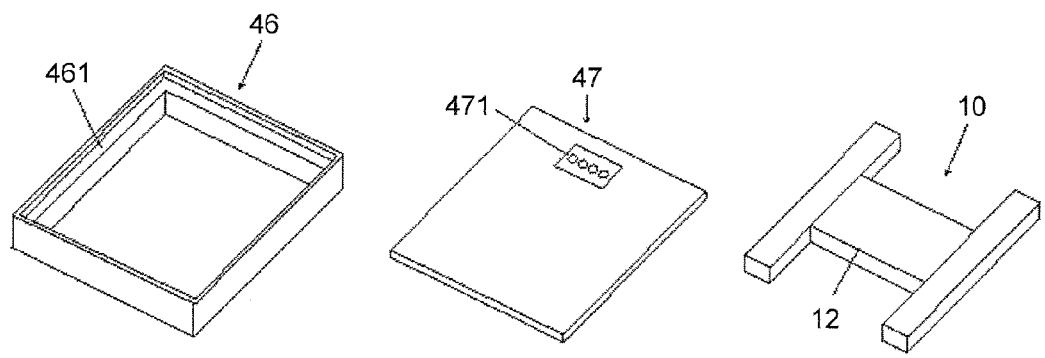
FIG.28A    FIG.28B
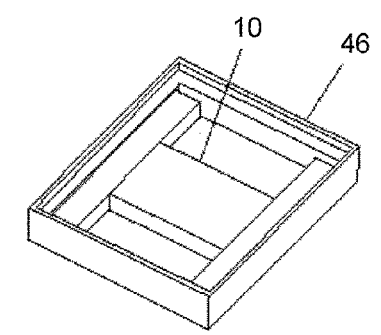
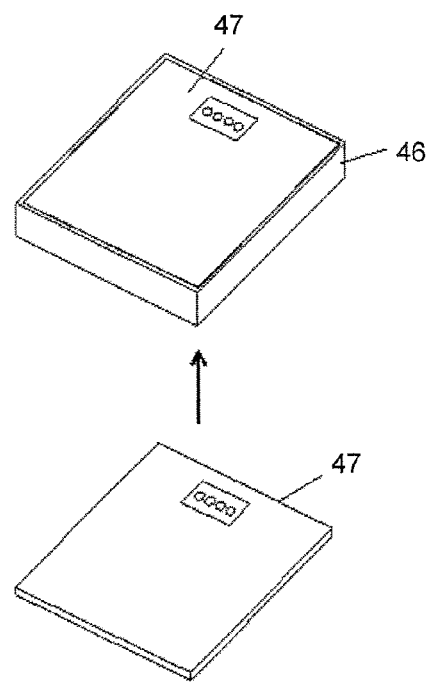

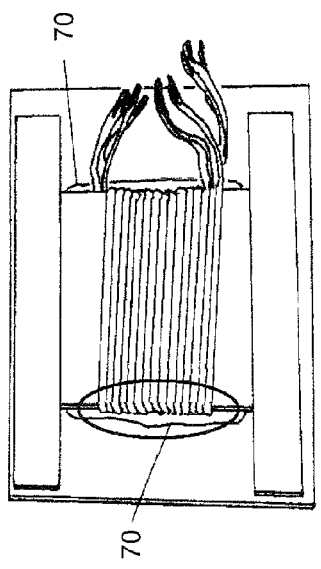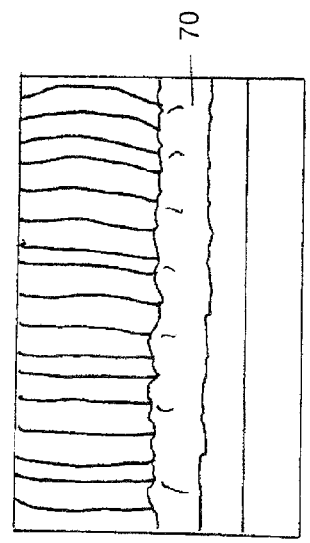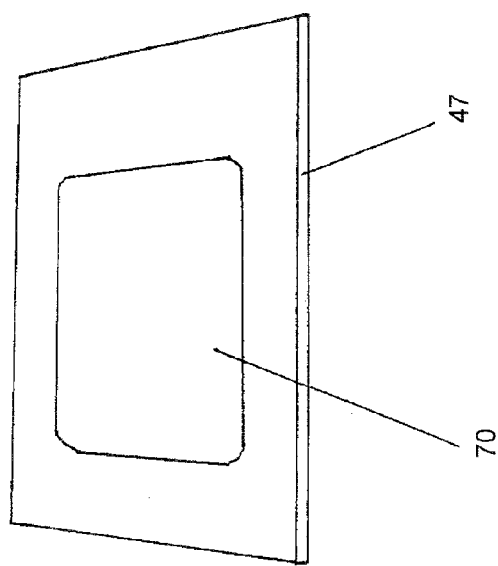
FIG.32B
FIG.32C
FIG.32A

FIG.33B
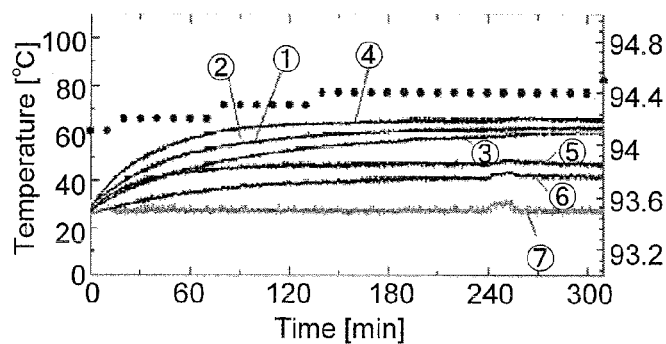
FIG.33A
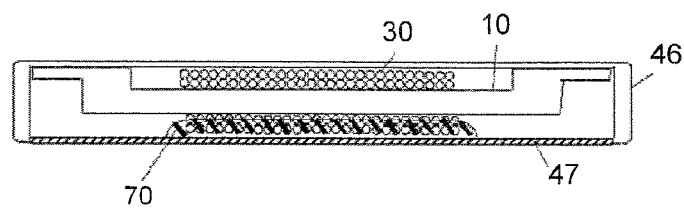
FIG.34
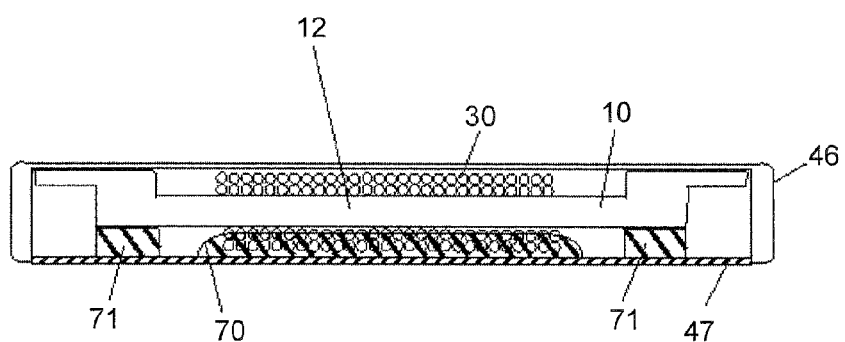
FIG.35A        FIG.35B
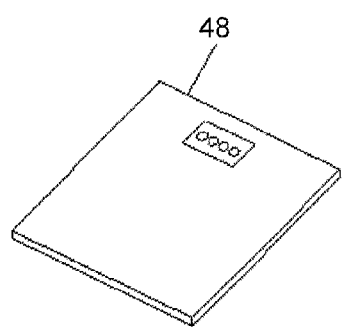   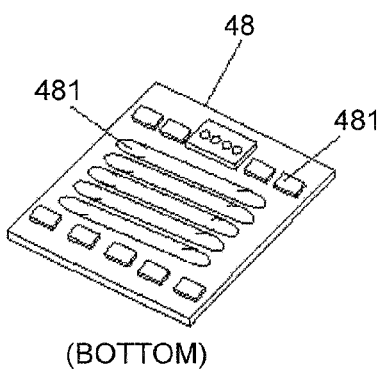
(TOP)              (BOTTOM)

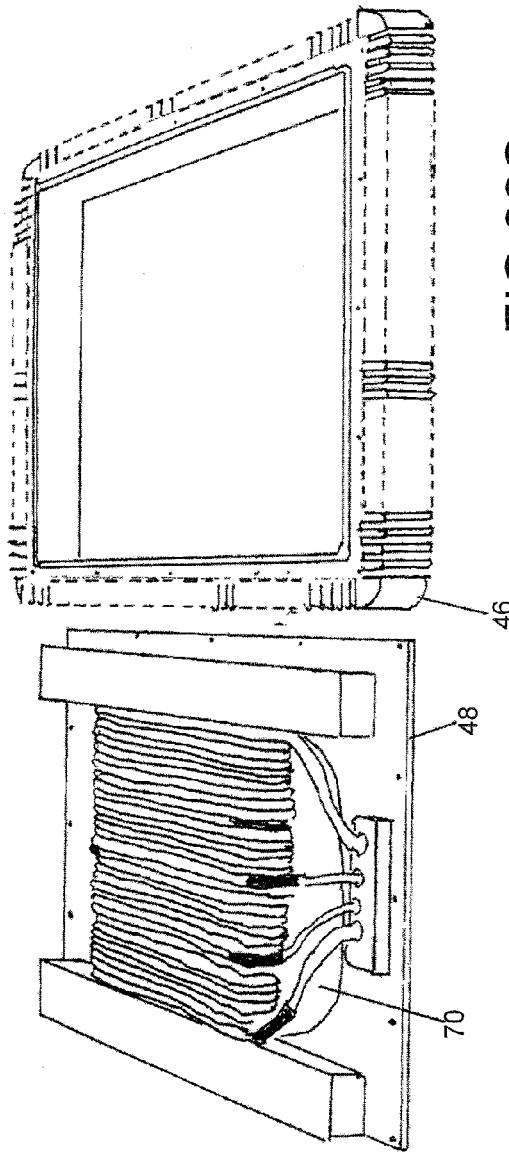
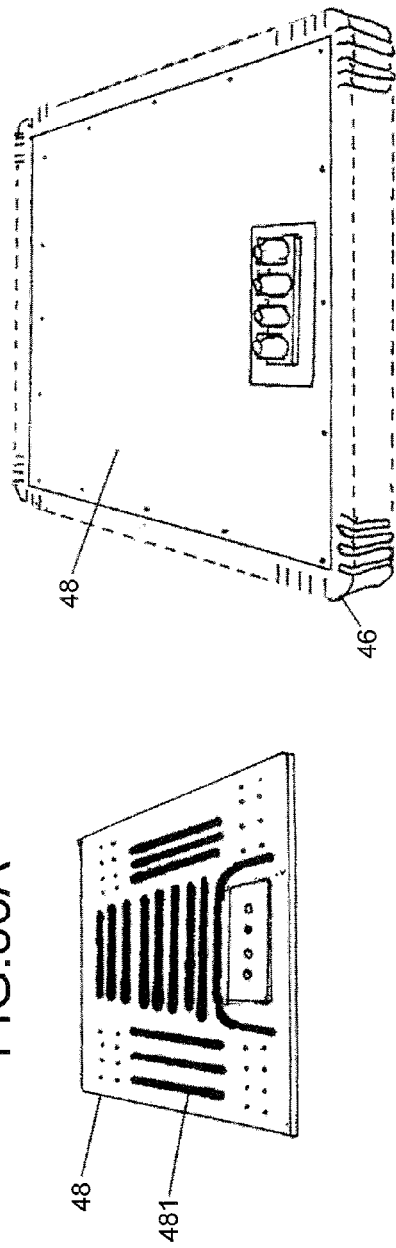
FIG.36B
FIG.36C
FIG.36A

FIG.37
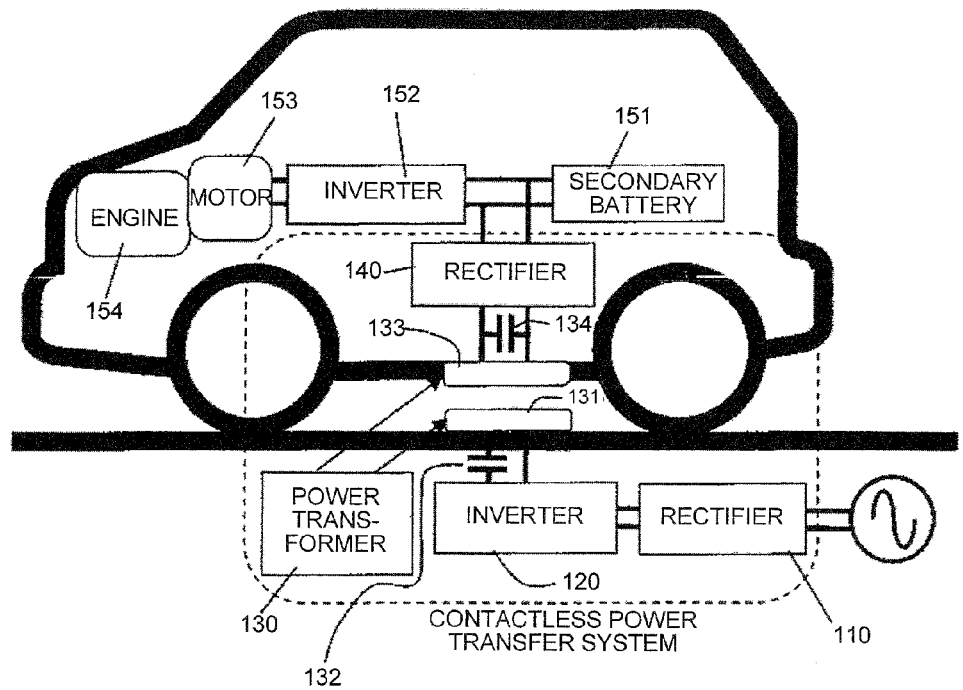
FIG.38A  FIG.38D
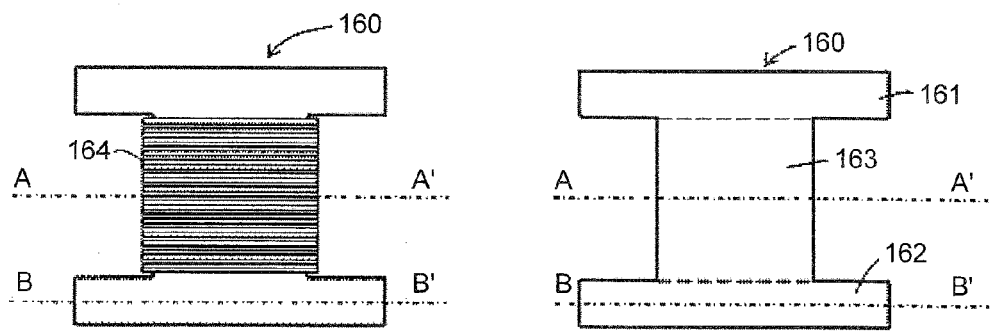
FIG.38B  FIG.38E
 
FIG.38C  FIG.38F
 

CONTACTLESS POWER TRANSFER APPARATUS

CROSS-REFERENCE TO RELATED APPLICATIONS

This application is 35 U.S.C. 371 National Phase Entry Application from PCT/JP2012/050969, filed Jan. 18, 2012, which claims the benefit of priority from Japanese Patent Application Nos. 2011-009300, filed Jan. 19, 2011; 2011-065899, filed Mar. 24, 2011; and 2011-192590, filed Sep. 5, 2011, the entire contents of which are incorporated herein by reference.

TECHNICAL FIELD

The present invention relates to a contactless power transfer apparatus of a power transmission side and a power reception side which performs contactless power transfer on a moving body such as an electric vehicle.

BACKGROUND ART

A contactless power transfer apparatus uses electromagnetic induction between a primary coil (power transmission coil) and a secondary coil (power reception coil) to supply power from the power transmission coil to the power reception coil. The contactless power transfer apparatus is expected to be widely spread as a rower transfer apparatus which charges a secondary battery mounted to an electric vehicle or a plug-in hybrid vehicle.

FIG. 37 illustrates a power transfer system of a plug-in hybrid vehicle which uses the contactless power transfer apparatus. A vehicle with an engine 154 and a motor 153 mounted as driving sources includes a secondary battery 151 which is a power supply for the motor 153, an inverter 152 which converts a direct current of the secondary battery 151 into an alternating current to supply the alternating current to the motor 153, a power reception coil 133 of the contactless power transfer apparatus, a rectifier 140 which converts the alternating current received by the power reception coil 133 into the direct current to supply the direct current to the secondary battery 151, and a capacitor 134 which is connected between the power reception coil 133 and the rectifier 140 in parallel. The power reception coil 133 is provided outside a floor of a vehicle body.

In the meantime, a power transfer station side (on the ground) includes an alternating current power supply having a commercial frequency, a rectifier 110 which converts the alternating current into a direct current, an inverter 120 which generates a high frequency alternating current from the direct current, and a power transmission coil 131 of the contactless power transfer apparatus. A driver stops the vehicle at a position where the power reception coil 133 is disposed directly on the power transmission coil 131 to start feeding power to the secondary battery 151.

In the power transfer system, even when the position of the power reception coil 133 is deviated with respect to the power transmission coil 131 or a gap between the coils is increased, a wide opposing area between coils needs to be established so as not to lower a power reception efficiency.

As a coil of a contactless power transfer apparatus for a vehicle, a coil (a single-sided winding coil) which is arranged by winding an electric wire in a spiral form in a single side of a flat ferrite core and a coil (double-sided winding coil) which winds an electric wire around the core are known. However, regarding the misalignment between coils, the double-sided winding coil has a smaller size than the single-sided winding coil so as to have advantages for good tolerance to the misalignment between coils and the small size of the power reception coil may be achieved by the double-sided winding coil.

In the following Patent Literature 1, the present inventors suggest that a coil 164 is wound around an H-shaped ferrite core 160 illustrated in FIG. 38 to form a power transmission coil and a power reception coil of the contactless power transfer system. FIGS. 38A to 38C illustrates a state in which the coil 164 is wound around the core 160 and FIGS. 38D to 38F illustrates a state in which only the core 160 exists.

In the case of the H-shaped core 160, the coil 164 is wound around a horizontal bar portion 163 of a letter H and vertical parallel bar portions 161 and 162 serve as magnetic poles into which magnetic flux enter or from which magnetic flux exit. As illustrated in FIG. 39, a main magnetic flux 190 which is output from the magnetic pole portion of the H-shaped core of a power transmission coil 170 enters the magnetic pole portion of the H-shaped core of a power reception coil 180. In a horizontal bar portion 181 around which a coil 182 is wound, the main magnetic flux proceeds in the core, is output from the other magnetic pole portion, and enters the magnetic pole portion of the H-shaped core of the power transmission coil 170.

A spatial magnetic flux distribution between a primary side core and a secondary side core is determined by shapes of the magnetic pole portions 161 and 162, and a magnetomotive force of the coil is determined by (an amount of a coil current)×(a number of windings). Therefore, if the shapes of the magnetic pole portions 161 and 162 and the number of windings of the coil 164 are changed, even though a width of the horizontal portion 163 of a letter H is narrowed to reduce a usage amount of the ferrite, the magnetomotive force of the core is not changed. In the meantime, a coil length (that is, an entire length of the electric wire) is (a length of an outer periphery of the horizontal bar portion of H)×(the number of winding) so that if the width of the horizontal bar portion of H is narrowed, the coil length is also reduced, a resistance of the coil is reduced, and a weight of the coil is lowered.

In the contactless power transfer apparatus which uses the double-sided winding coil, a core member which covers a non-opposite-face side of the coil like the single-sided wounding coil is not provided so that, as illustrated in FIG. 39, leakage magnetic fluxes 191 and 192 which detour the non-opposite-face side of the coil are generated. If the leakage magnetic flux 192 permeates a steel plate of the floor of the vehicle body, an induced current flows therein to heat the steel plate so that power transfer efficiency is significantly lowered. Therefore, in the contactless power transfer apparatus which uses the double-sided winding coil, it is required to arrange a non-magnetic good conductor (non-magnetic conductor plate) such as an aluminum plate 173 or 183 on the rear surface of the coil to perform magnetic screening of the leakage magnetic fluxes 191 and 192.

An area of the non-magnetic conductor plate 183 which is provided on the rear surface of the power reception coil 180 is desirably set to have a size enough to arrange substantially entire power transmission coil 170 below the non-magnetic conductor plate 183 even when the power reception coil 180 is arranged in anywhere within an tolerable range of the misalignment. Therefore, the area of the non-magnetic conductor plate 183 is much larger than an area of a plane shape of the power reception coil 180.

CITATION LIST

Patent Literature

Patent Literature 1: Japanese Patent Application Laid-open No. 2011-50127

SUMMARY OF INVENTION

Problem to be Solved by the Invention

Generally, the power transmission coil and the power reception coil of the contactless power transfer apparatus face each other while placed in a case. Here, an opposite distance is called as a "mechanical gap length". Practically, a specification of each coil is set based on the mechanical gap length.

In the double-sided winding coil, as illustrated in FIG. 40, a width of a winding portion 50 is the largest so that a mechanical gap length may be determined by a distance (gap length) D1 between winding portions 50.

However, with the above configuration, the "magnetic gap length" which is a distance D2 between the ferrite surfaces which configures the magnetic pole portion is larger than the gap length D1 between the winding portions 50. In order to improve the power transfer efficiency of the coil, it is required to reduce the magnetic gap length without changing the mechanical gap length.

Further, even though the ferrite has a magnetic property suitable for the core, the ferrite is easily brittle and cracked. The large size ferrite may be broken due to magnetostriction. Further, the ferrite core of the power reception coil which is arranged outside the floor of the vehicle body may be broken due to the impact when a rolling stone collides with a driving wheel. Therefore, as a material for the core which is used for the contactless power transfer apparatus, it is required to find out a new material instead of the ferrite.

Further, in the contactless power transfer apparatus, even though a lead wire (high frequency litz wire) of a winding of the power reception coil arranged outside the floor of the vehicle body is required to be led in the vehicle to be electrically connected with a secondary parallel resonance capacitor 134 or a rectifier 40, when the lead wire is led into the vehicle, a magnetic conductor plate arranged at the rear surface side (floor side) of a power reception coil 33 serves as a hindrance.

When the lead wire of the power reception coil extends to an edge of the non-magnetic conductor plate and detours the non-magnetic conductor plate so as to be led into the vehicle, an entire length of an expensive lead wire is increased, a weight and a cost are increased, and heat loss by a specific resistance is also increased. Further, the alternating current which is received by the power reception coil 33 is high frequency of several tens of kHz, which may cause high frequency noise.

On the other hand, in order to reduce a lead-out distance of the lead wire of the coil winding, if a hole is formed in the non-magnetic conductor plate and the lead wire passes through the hole, a leakage magnetic flux leaked from the hole permeates a floor steel plate of the vehicle body, which may heat the floor steel plate or lower a power transfer efficiency.

Further, also when the secondary parallel resonance capacitor 134 and the rectifier 40 arranged in the vehicle are distributed, the length of the wire line connecting the secondary parallel resonance capacitor 134 and the rectifier 40 is increased. Therefore, a volume and a weight of the contactless power transfer apparatus with respect to the vehicle are increased, a high frequency noise is generated, and the cost is increased.

Further, the double-sided winding coil has a worse heat radiation property than the single-sided winding coil. Therefore, it is required to improve the thermal radiation property of the contactless power transfer apparatus which holds the double-sided winding coil in the case.

The present invention has been made to solve the aforementioned problems, and it is an object of the present invention to provide a contactless power transfer apparatus with a high power transfer efficiency, a small size and lightweight, low cost, and a good thermal radiation property.

Means for Solving Problem

The present invention is a contactless power transfer apparatus comprising one of a power transmission coil and a power reception coil opposing each other to perform contactless power transfer is held in a case. The power transmission coil or the power reception coil held in the case includes a core and an electric wire. The core has magnetic pole portions at both ends and a wound portion around which the electric wire is wound between the magnetic pole portions. The electric wire is wound around the wound portion of the core. With reference to a position of a wide core surface of the wound portion, at a side opposing a counterpart coil, a height of a core face of the magnetic pole portions opposing the counterpart coil of the core is equal to or greater than a height of an outer circumference of the electric wire wound around the wound portion, and at a side not opposing the counterpart coil, a height of a core face is less than the height of the outer circumference of the electric wire wound around the wound portion.

When this core is used for the power transmission/power reception coil of the contactless power transfer apparatus, a magnetic gap length is equal to or smaller than a gap length between winding portions. Therefore, an inter-coil coupling factor is improved and the power transfer efficiency and a maximum feed power are increased.

Further, according to a contactless power transfer apparatus of the present invention, the magnetic pole portions of the core are formed from a pair of parallel magnetic members, the wound portion of the core is formed of a magnetic member which is perpendicular to the magnetic pole portions, and the core is formed in H-shape by the pair of magnetic members constituting the magnetic pole portions and the magnetic member constituting the wound portion When the H-shaped core is used, an amount of a magnetic material used for the H-shaped core may be reduced.

Further, according to a contactless power transfer apparatus of the present invention, the power transmission coil or the power reception coil having the core of H-shape is held in the case formed by a resin, the case is fixed to a non-magnetic conductor plate for magnetic screening, a housing is arranged on an opposite face of a face of the non-magnetic conductor plate to which the case is fixed, and at least a capacitor which is connected to the coil in the case in parallel and a rectifying circuit are held in the housing.

In the contactless power transfer apparatus, the power reception coil, the parallel resonance capacitor and the rectifying circuit are integrated with the non-magnetic conductor plate for magnetic screening therebetween so that the contactless power transfer apparatus may be compact with a short wiring line.

Further, according to a contactless power transfer apparatus of the present invention, the case has a case through hole arranged near a center line which divides a spacing between the parallel magnetic pole portions of the core of H-shape into two parts, the non-magnetic conductor plate has a communicating through hole which overlaps the case through hole, and a lead wire of the electric wire wound around the wound portion of the core is inserted into the case through hole and the communicating through hole to be led into the housing and electrically connected to the capacitor and the rectifying circuit.

Since distribution of the leakage magnetic flux of the coil comprising the H-shaped core is small at a center between the magnetic pole portions, even though a through hole through which the lead wire passes is formed at the center, the magnetic screening effect of the non-magnetic conductor plate is not deteriorated.

Further, according to a contactless power transfer apparatus of the present invention, the case through holes of the case are formed as a pair arranged to interpose the center line therebetween, and a lead wire connected to one end of the electric wire wound around the wound portion of the core and a lead wire connected to other end of the electric wire are inserted into the paired case through holes, respectively.

Case through holes are arranged at both side of the center line so that a distance from the coil to the outermost case through hole is reduced and thus the case can be compact.

Further, according to a contactless power transfer apparatus of the present invention, the communicating through holes of the non-magnetic conductor plate which overlap the case through holes and formed as a pair are connected to each other by a slit.

The slit which connects the pair of communicating through holes may cut off an eddy current which occurs in the non-magnetic conductor plate.

Further, according to a contactless power transfer apparatus of the present invention, a plurality of electric wires are wound around the wound portion of the core in parallel, and a number of pairs of the case through holes arranged to interpose the center line of the case therebetween corresponds to the number of electric wires.

Further, according to a contactless power transfer apparatus of the present invention, an area of the non-magnetic conductor plate is larger than a contact area of the case with respect to the non-magnetic conductor plate, and the case is fixed to the non-magnetic conductor plate so that a center position of the held power transmission coil or the power reception coil matches with a center position of the non-magnetic conductor plate.

An area of the non-magnetic conductor plate is set to be wide such that even though the power reception coil is arranged at any positions within a tolerable range of the misalignment, substantially entire power transmission coil is arranged below the non-magnetic conductor plate and the power reception coil is fixed to the center of the non-magnetic conductor plate.

Further, according to a contactless power transfer apparatus of the present invention, the case has a space holding the power transmission coil or the power reception coil, the case includes a resin cover in which a face opposite the face facing the counterpart coil is open and a fixing plate fixed to the resin cover so as to close the opening of the resin cover, and the fixing plate is formed of a non-magnetic conductive metal material.

The fixing plate of the case is formed of a non-magnetic conductor plate such as aluminum and has both functions as a shielding material of the leakage magnetic flux and a thermal radiating material. Heat due to winding resistance loss is conducted to the fixing plate to be radiated from the fixing plate so that the increase of the temperature of the contactless power transfer apparatus is suppressed.

Further, according to a contactless power transfer apparatus of the present invention, a high thermal conductive insulating resin is interposed between the fixing plate and the electric wire wound around the wound portion of the core.

In this case, the heat of the coil due to the winding resistance loss is conducted to the fixing plate through the high thermal conductive insulating resin such as silicon based resin having a high thermal conductivity and then radiated from the fixing plate. Therefore, the thermal radiation property may be significantly improved.

Further, according to a contactless power transfer apparatus of the present invention, the electric wire is wound around the wound portion of the core to form a multiple layers, and a thickness of the high thermal conductive insulating resin is set to a thickness so that at least one layer of the electric wire is buried in the high thermal conductive insulating resin.

Further, according to a contactless power transfer apparatus of the present invention, the high thermal conductive insulating resin is interposed also between the fixing plate and a part of the core other than the wound portion.

In this case, heat which is generated in the core due to the iron loss is also conducted to the fixing plate through the high thermal conductive insulating resin and radiated from the fixing plate so that the thermal radiation property is improved.

Further, according to a contactless power transfer apparatus of the present invention, the wound portion of the core is covered by a winding bobbin formed by the high thermal conductive insulating resin, and the electric wire is wound around the winding bobbin.

In this case, the heat which is generated in the core due to the iron loss or a Joule heat which is generated in the winding is conducted to the fixing plate through the winding bobbin which is formed of the high thermal conductive insulating resin and radiated from the fixing plate.

Further, according to a contactless power transfer apparatus of the present invention, a cooling insulating oil is enclosed in the case, and a protrusion for enlarging a contact area with respect to the cooling insulating oil is provided on a contact face of the fixing plate with respect to the cooling insulating oil.

In this case, the heat of the winding due to the resistance loss or the heat of the core due to the iron loss is conducted to the fixing plate through the cooling insulating oil and radiated from the fixing plate. Therefore, the thermal radiation property is improved.

Further, according to a contactless power transfer apparatus of the present invention, the protrusion is provided within a range so that eddy-current loss in the fixing plate due to the leakage magnetic flux from the coil does not exceed a predetermined amount.

Further, according to a contactless power transfer apparatus of the present invention, the wound portion of the core is formed of a laminated body in which a plurality of amorphous magnetic alloy ribbons are laminated, the magnetic pole portions of the core are formed by a ferrite, a laminated face of the laminated body is parallel to a surface of the wound portion from one of the magnetic pole portions to other one of the magnetic pole portions, and an end face of the wound portion at which the end faces of the ribbons appear abuts against the magnetic pole portions.

When the laminated face of the amorphous core is perpendicular to an advancing direction of the magnetic flux, a large eddy-current loop is generated to cause large eddy-current loss and the iron loss which is a sum of the hysteresis loss and the eddy-current loss is increased. However, in the coil, the laminated face of the amorphous core is parallel to the advancing direction of the magnetic flux so that the eddy-current loss is small and the iron loss may be suppressed.

Further, according to a contactless power transfer apparatus of the present invention, the wound portion of the core is formed of the laminated body including a flat panel shape part and a bent part which is bent in a direction of the magnetic pole portions at an end edge side of the flat panel shape part which abuts against the magnetic pole portions.

An amorphous alloy having excellent formability may be deformed to be various shapes. In the core, the bent part is provided in the amorphous core so that a height position of the ferrite plate of the magnetic pole portion may be raised and the magnetic gap length may be shortened.

Further, a contactless power transfer apparatus of the present invention, further comprises: a rectangular coil bobbin comprising an insertion hole into which the wound portion of the core is inserted; and two magnetic pole cases holding the magnetic pole portions of the core, respectively, wherein the wound portion of the core is inserted into the insertion hole of the coil bobbin so as to expose the end faces, and the coil bobbin and the magnetic pole cases are coupled so that the end faces of the wound portion of the core exposed from the insertion hole abuts against the magnetic pole portions of the core held in the magnetic pole cases, respectively.

A positional relation between the amorphous core and the ferrite plate of the magnetic pole portion is defined by the coil bobbin and the magnetic pole case.

Further, according to a contactless power transfer apparatus of the present invention, the wound portion of the core is formed from two laminated bodies comprising a flat plate shape part and a bent part which is bent in the direction of the magnetic pole portions at one end edge side of the flat plate shape part which abuts against the magnetic pole portions, and each of the laminated bodies is inserted from an opening at both sides communicating to the insertion hole of the coil bobbin so that distal ends of the flat plate shape parts abut against each other in the insertion hole as well as the bent part protrudes from the insertion hole, and end faces of the bent parts abut against the magnetic pole portions of the core in the magnetic pole case, respectively.

A laminated body divided into two parts is inserted into an insertion hole of the coil bobbin at both sides so that the wound portion having the bent parts can be inserted into the insertion hole of the coil bobbin.

Effect of the Invention

According to the contactless power transfer apparatus of the present invention, a height of a surface of a core magnetic pole portion on the side facing the counterpart coil is equal to or larger than the height of the outer circumference of the electric wire wound around the wound portion of the core so that the magnetic gap length can be reduced while maintaining the mechanical gap length. By doing this, the inter-coil coupling factor is improved and the power transfer efficiency and the maximum transfer power are increased.

Further, since the resin case in which the coil is held is fixed to the non-magnetic conductor plate for magnetic screening and the capacitor and the rectifier which are connected by the coil are arranged on the other side of the non-magnetic conductor plate, the contactless power transfer apparatus may be compact with a short wire, the high frequency noise may be reduced, and the weight and the cost may be reduced by the reduced high frequency litz wire.

Further, a lead wire leading-out hole of the coil is provided near a center line which divides the magnetic pole portions of the H-shaped core into two parts so that the lead-out distance of the coil lead wire may be shortened without sacrificing the magnetic screening effect of the non-magnetic conductor plate, a small size and light weight contactless power transfer apparatus may be achieved, and the lowering of power transfer efficiency may be suppressed.

Further, an opening of the resin cover in which the coil is held is closed by the non-magnetic conductor plate and the non-magnetic conductor plate is used as a magnetic shielding material and a thermal radiating material so that the thermal radiation property of the contactless power transfer apparatus may be improved.

Further, the heat of the coil or the core is conducted to the non-magnetic conductor plate through the high thermal conductive insulating resin so that the thermal radiation property of the contactless power transfer apparatus may be improved.

When the wound portion which occupies a large area of the core is formed of the amorphous core, the mechanical strength is increased and brittleness of the core is improved. Further, the formation thereof is simple and workability during the manufacturing is improved. Further, the amorphous core which is mass-produced is used so that the cost of the contactless power transfer apparatus may be reduced.

BRIEF DESCRIPTION OF DRAWINGS

FIGS. 1A-1C are diagrams illustrating a coil of a contactless power transfer system according to a first embodiment of the present invention;

FIGS. 2A-2B are diagrams illustrating an H-shaped core of a contactless power transfer system according to a second embodiment of the present invention;

FIGS. 24A-24C are diagrams illustrating a contactless power transfer system according to a fifth embodiment of the present invention;

FIG. 27 is a diagram illustrating components of a contactless power transfer system according to a sixth embodiment of the present invention;

FIGS. 28A-28B are diagrams illustrating an assembling process of the contactless power transfer apparatus of FIG. 27;

FIGS. 32A-32C are diagrams illustrating an actual manufacturing process of the apparatus of FIGS. 31A-31C;

FIGS. 33A-33B are diagrams illustrating a temperature raising test result of the contactless power transfer apparatus of FIGS. 32A-32C;

FIG. 34 is a diagram illustrating a modification of the apparatus of FIGS. 31A-31C;

FIGS. 35A-35B are diagrams illustrating a fixing plate of a contactless power transfer apparatus using a cooling insulating oil;

FIGS. 36A-36C are diagrams illustrating a manufacturing process of the contactless power transfer apparatus using a cooling insulating oil and a high thermal conductive insulating resin;

FIG. 37 is a diagram illustrating an application example of the contactless power transfer apparatus to a vehicle;

FIGS. 38A-38F are explanatory diagrams of an H-shaped core;

MODES FOR CARRYING OUT THE INVENTION

First Embodiment

Figure 3A:
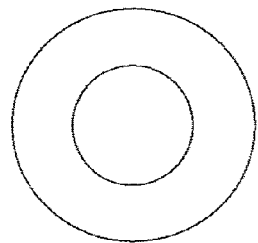
FIGS. 3A-3C are diagrams illustrating a manufacturing method of an amorphous core of FIGS. 2A-2B.

FIG. 1 illustrates a coil of a contactless power transfer apparatus according to a first embodiment of the present invention. A core used in the coil includes: a pair of parallel magnetic pole core members 11; and a wound portion core member 12 perpendicular to the magnetic pole core members 11 and around which an electric wire is wound. The magnetic pole core members 11 and the wound portion core member 12 form an H-shaped core. The wound portion core member 12 has a winding portion 30 where the electric wire is wound. FIG. 1A is a plan view, FIG. 1B is a side view of one pair of opposing H-shaped cores as seen from the magnetic pole core member 11, and FIG. 1C is a side view as seen from a direction of 90 degree from FIG. 1B.

Here, it is described that the magnetic pole core members 11 and the wound portion core member 12 are ferrites. The ferrite core does not need to be formed by one large sheet of plate, but it can be formed by a combination of a plurality of small sized ferrite plates.

The winding portion 30 where the electric wire is wound is mounted at the center of the wound portion core member 12 which is formed of the ferrite plate, and a magnetic pole portion is configured by magnetic pole core members 11 which are arranged at both ends of the ferrite plate protruding from both sides of the winding portion 30.

A lower ferrite plate 13 is laminated on the magnetic pole portion, as illustrated in FIG. 1C, such that a height of the uppermost portion of the magnetic pole core member 11 (here, "height" is a height with reference to a position of a wide surface of the wound portion core member 12) is equal to or larger than the height of the winding portion 30, and the magnetic pole core member 11 is arranged on the lower ferrite plate 13 on a side facing a counterpart coil.

As described above, by attaching a "leg" which is formed of the lower ferrite plate 13 to the magnetic pole core member 11, a magnetic gap length D2 may be equal to or smaller than a gap length D1 of the winding portion 30. When the leg is attached so as to allow the magnetic gap length D2 to be equal to the gap length D1 of the winding portion 30, the magnetic gap length may be reduced without changing the mechanical gap length.

As described above, if the magnetic gap length is shortened, an inter-coil coupling factor is improved and the power transfer efficiency and the maximum feed power are increased.

Further, the number of lower ferrite plates 13 to be laminated, which is serving as a leg, may be appropriately set.

Further, it is not necessary to precisely match the magnetic gap length D2 with the gap length D1 of the winding portion 30, and the magnetic gap length D2 and the gap length D1 of the winding portion 30 can differ from each other slightly. The terminology "equal" used in the claims has the above meaning.

Second Embodiment

In a second embodiment, it has been described that an amorphous core is used as the wound portion core member.

FIG. 2 illustrates an H-shaped core according to the second embodiment of the present invention. FIG. 2A is a perspective view, and FIG. 2B is a side view.

The H-shaped core is configured such that the wound portion core member is formed of an amorphous core 21 in which a plurality of amorphous magnetic alloy ribbons are laminated, and the magnetic pole core member is formed of a ferrite plate 14.

Figure 3B:
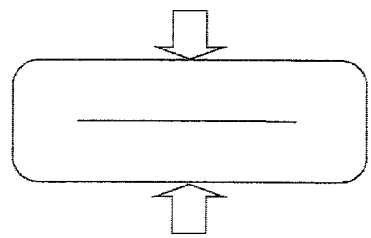
Figure 3C:
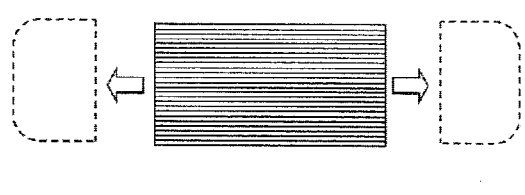

The flat panel shaped amorphous core 21 may be manufactured by a method illustrated in FIG. 3. The manufacturing method is a method which has been conventionally used to manufacture the amorphous core of a pole transformer. A molten metal of an amorphous magnetic alloy material having iron as a main member is ejected onto a cooling roller which rotates at a high speed from a slit of a nozzle, rapidly cooled, and solidified to manufacture an amorphous alloy ribbon having a thickness of approximately 25 μ. The ribbon is wound to be a coil shape (see FIG. 3A), the coil is pressed (see FIG. 3B), and then a thermal processing for removing a distortion and a resin impregnating process for fixing an interval of the ribbons are performed in this condition. Thereafter, both ends are cut (see FIG. 3C) to manufacture a laminated body of the amorphous core. A resin layer between the ribbons has a thickness of approximately 1 μ.

At an end face of the amorphous core 21 on the ferrite plate 14 side, a plurality of end faces of the ribbons appear, and the end face of the amorphous core 21 abuts against the ferrite plate 14.

Figure 4:
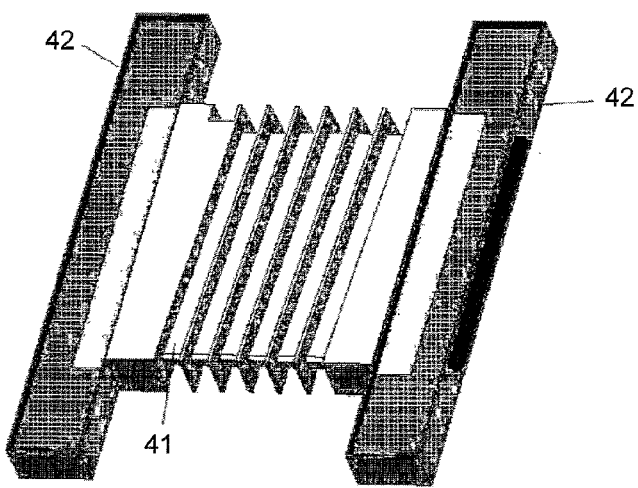
FIG. 4 is a diagram illustrating a connection mode of a coil bobbin and a magnetic pole case.

FIG. 4 illustrates a coil bobbin 41 and magnetic pole cases 42 which define the positional relation between the H-shaped amorphous core and the ferrite plate of the magnetic pole portion. The rectangular coil bobbin 41 has an insertion hole through which the amorphous core is inserted and a winding partition on a circumference thereof. The amorphous core is inserted into the insertion hole of the coil bobbin 41 so as to expose both ends.

The coil bobbin 41 into which the amorphous core is inserted is fixed to the magnetic pole cases 42 so as to expose the ends of the amorphous core to the magnetic pole cases 42, and the ferrite plate is held in the magnetic pole cases 42 so as to be abut against the end of the amorphous core, and then molded in the magnetic pole cases 42 by a resin.

Figure 5A:
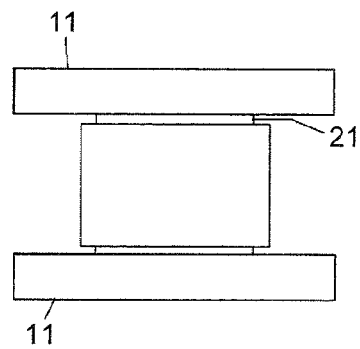
FIGS. 5A-5C are diagrams illustrating a configuration of reducing a magnetic gap length of the H-shaped core according to the second embodiment.
Figure 5C:
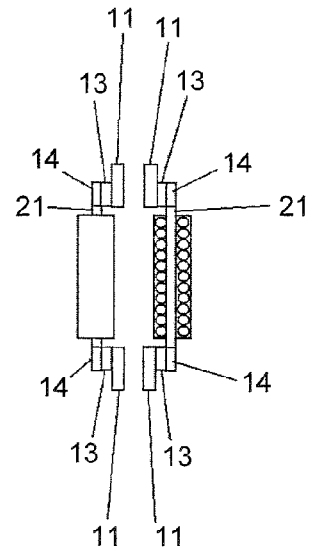
Figure 5B:
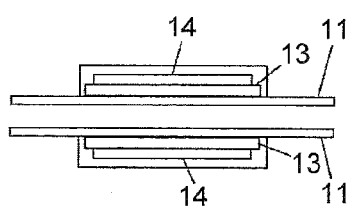

In this case, in order to shorten the inter-coil magnetic gap length, as illustrated in FIG. 5, the ferrite plate in the magnetic pole case 42 is formed such that the ferrite plate 14 (ferrite plate having the same width as the amorphous core 21) where the end surface of the flat panel shaped amorphous core 21 abuts and the lower ferrite plate 13 are laminated and the ferrite plate 11 for a magnetic pole is arranged thereon.

In the H-shaped core, the amorphous core 21 which forms the winding portion and the ferrite plate 14 which forms the magnetic pole portion configure a hybrid magnetic circuit.

When a magnetic path of the magnetic circuit is perpendicular to the laminated face of the amorphous core 21, a large eddy-current loop is formed in the amorphous core 21 by the advancing magnetic flux, and the eddy-current loss is increased. Accordingly, an iron loss which is a sum of the hysteresis loss and the eddy-current loss is increased.

In contrast, in the hybrid magnetic circuit, the laminated face of the amorphous core 21 is parallel to the magnetic path so that the eddy-current loop generated in the amorphous core 21 is small and the eddy-current loss is negligible. Therefore, the iron loss of the H-shaped core is small.

Therefore, when the H-shaped core is used for the contactless power transfer apparatus, the substantially same power transfer efficiency and maximum feed power as those in the case when a core formed only by ferrite is used may be obtained.

Third Embodiment

In a third exemplary embodiment, in order to shorten the inter-coil magnetic gap length, it has been described that the amorphous core having a bent part is used as a wound portion core member.

Figure 6A:
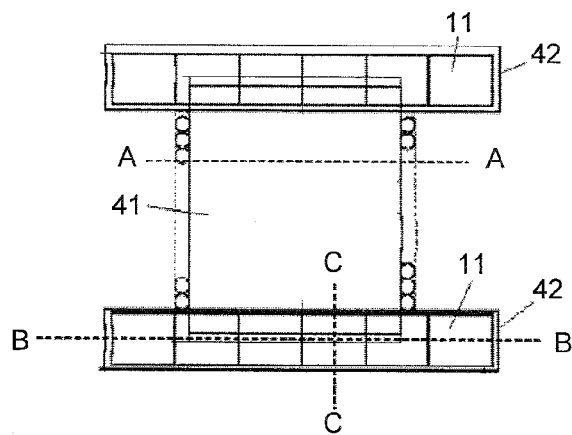
FIGS. 6A-6D are diagrams illustrating a coil of a contactless power transfer system according to a third embodiment of the present invention.
Figure 6B:
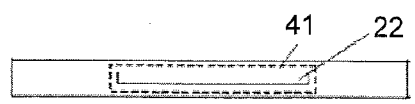
Figure 6C:
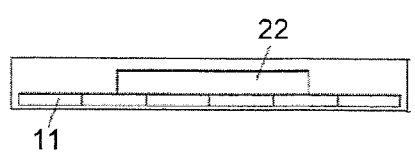
Figure 6D:
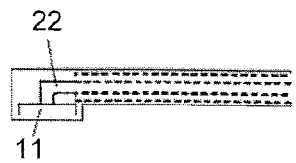

FIG. 6A is a plan view of the H-shaped core, FIG. 6B is a cross-sectional view taken along a line A-A, FIG. 6C is a cross-section view taken along a line B-B, and FIG. 6D is a cross-section view taken along a line C-C.

As illustrated in FIG. 6D, a leading end of the amorphous core 22 of the H-shaped core which abuts against the ferrite plate 11 is bent to be substantially an L-shape. The bent part protrudes from a hole of the rectangular coil bobbin 41, enters the magnetic pole case 42, and abuts against the ferrite plate 11 where the leading end of the bent part is held in the magnetic pole case 42.

The bent part serves as a leg for shortening the magnetic gap length.

Figure 7A:
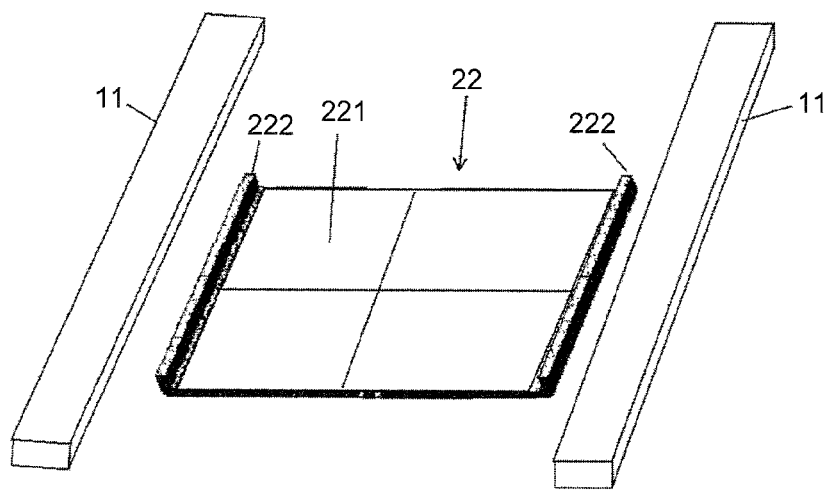
FIGS. 7A-7B are diagrams illustrating an H-shaped core which uses an amorphous core of FIGS. 6A-6D in which an edge portion is bent.
Figure 7B:
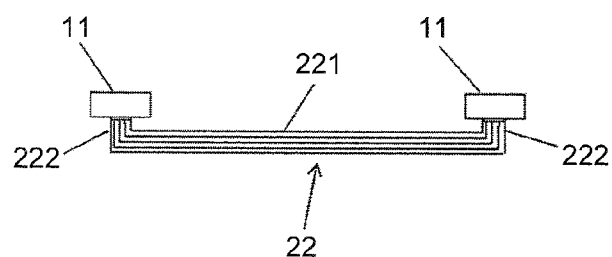

FIG. 7 schematically illustrates a connection relation between the amorphous core 22 and the ferrite plate 11, and FIG. 7A is a perspective view (which illustrates a state in which the amorphous core 22 is separated from the ferrite plate 11) and FIG. 7B is a side view.

The amorphous core 22 includes a flat panel shape part 221, and bent parts 222 which are bent to be a substantially L-shape at edge portions of the flat panel shape part 221 close to the ferrite plates 11. A plurality of laminated faces of ribbons in the amorphous core 22 are parallel to a surface of the amorphous core 22 from one ferrite plate to the other ferrite plate. That is, the laminated faces are parallel to a surface of the flat panel shape part 221 of the amorphous core 22 in the flat panel shape part 221 and are parallel to a surface of the bent part 222 of the amorphous core 22 in the bent part 222. Therefore, the ferrite plate 11 abuts against the end face of the bent part 222 where a plurality of end surfaces of ribbons appear.

Figure 8:
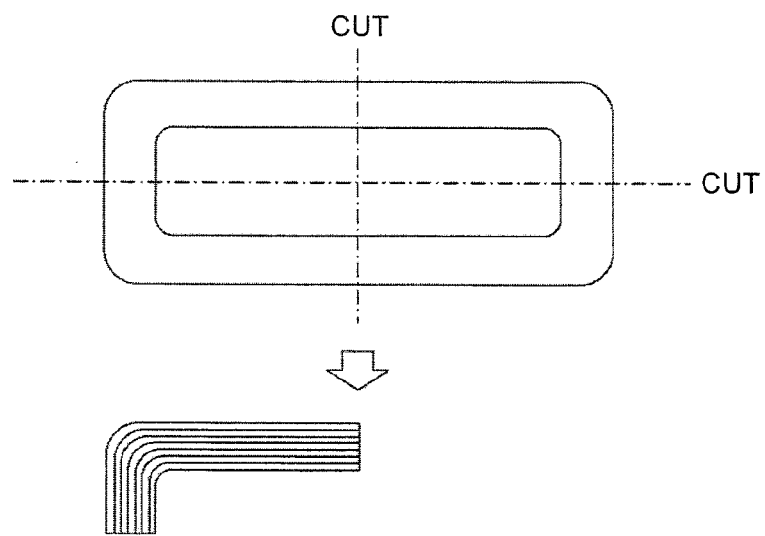
FIG. 8 is a diagram illustrating a manufacturing method of the amorphous core of FIGS. 7A-7B.

As illustrated in FIG. 8, the amorphous core 22 is manufactured by pressing the coil of the amorphous alloy ribbon and cutting the coil to be an L-shape.

The bent part 222 of the amorphous core 22 has the same function as the lower ferrite plate 13 of FIG. 5 and the position of the ferrite plate 11 which abuts against the end face of the bent part 222 is pressed to shorten the magnetic gap length.

The bent part 222 of the amorphous core 22 does not pass through the insertion hole for the amorphous core formed in the rectangular coil bobbin 41.

Figure 9:
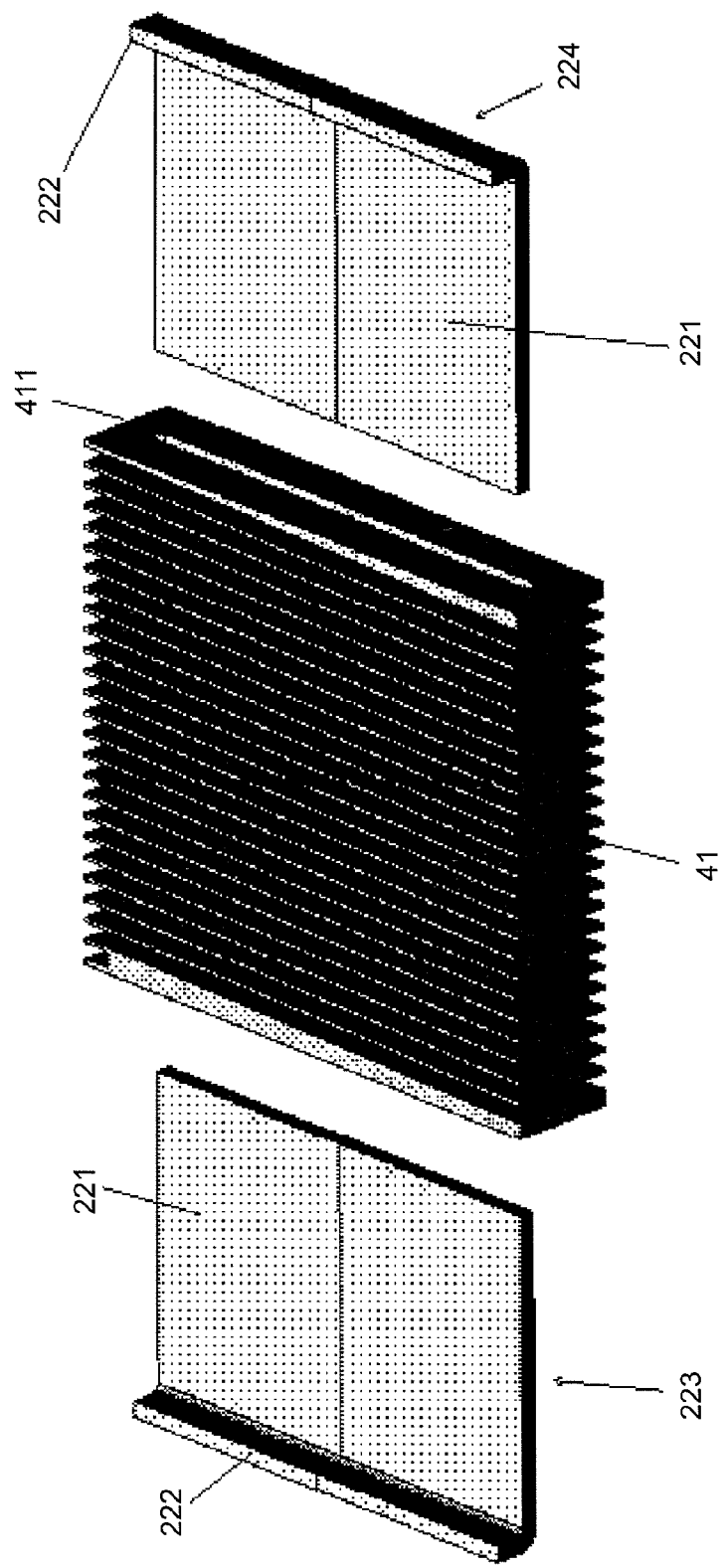
FIG. 9 is a diagram illustrating a method of inserting the amorphous core of FIGS. 7A-7B into a coil bobbin.

Therefore, as illustrated in FIG. 9, the amorphous core 22 is configured by: a semi amorphous core body 223 having the flat panel shape part 221 and the bent end portion 222 formed at one edge portion; and a semi amorphous core body 224 having the flat panel shape part 221 and the bent end portion 222 formed at the other edge portion. Further, as illustrated in FIG. 10, the semi amorphous core body 223 and the semi amorphous core body 224 are inserted from both sides of the insertion hole 411 of the rectangular coil bobbin 41, respectively, and the leading ends of the semi amorphous core body 223 and the semi amorphous core body 224 abut with each other in the insertion hole.

Figure 10:
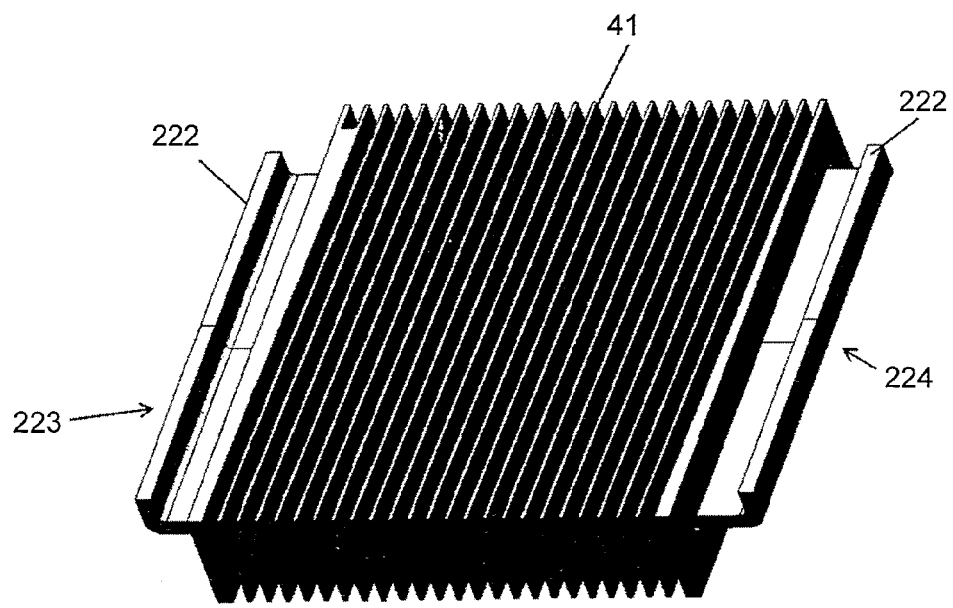
FIG. 10 is a diagram illustrating a state in which the amorphous core of FIGS. 7A-7B is inserted into a coil bobbin.

Further, in FIGS. 9 and 10, the semi amorphous core bodies 223 and 224 are configured by two amorphous members which are parallel in a horizontal direction. However, the number of the amorphous members which are parallel in the horizontal direction may be three or more or only one.

Figure 11:
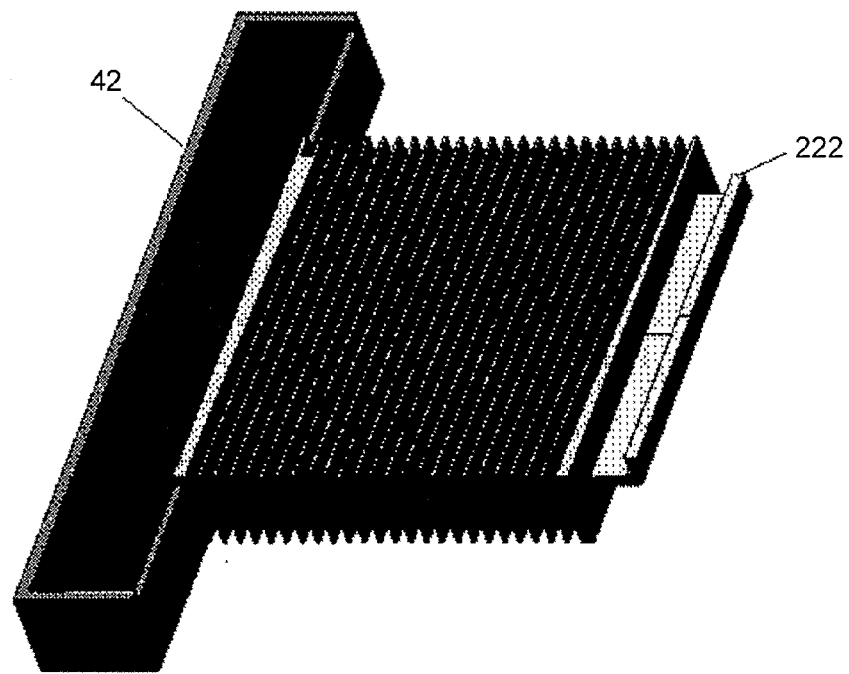
FIG. 11 is a diagram illustrating a state in which the amorphous core of FIG. 10 is inserted into a coil bobbin.

Within the magnetic pole case 42, the bent end portion 222 which protrudes from the insertion hole 411 of the rectangular coil bobbin 41 in the state of FIG. 10, as illustrated in FIG. 11, abuts the ferrite plate held in the magnetic pole case 42.

In the hybrid magnetic circuit which is formed by the H-shaped core ferrite plate 11 and the semi amorphous core bodies 223 and 224, the magnetic path does not intersect the laminated face of the ribbon in the semi amorphous core bodies 223 and 224 so that the iron loss of the amorphous core may be suppressed to be small.

Figures 12, 13:
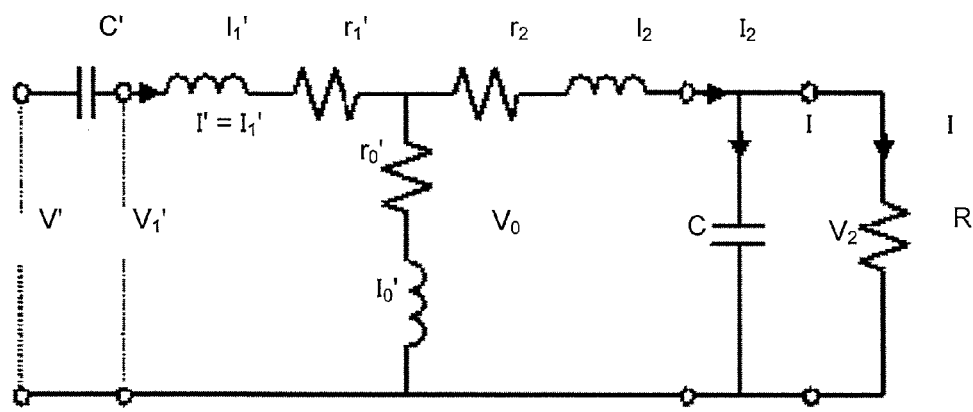
FIG. 12 is a diagram illustrating a characteristic comparison of the contactless power transfer system using an amorphous core and a ferrite core.
FIG. 13 is an equivalent circuit diagram of the contactless power transfer system.

FIG. 12 illustrates a result of measurement of the power transfer efficiency of when the H-shaped core using the amorphous core and the H-shaped core formed of the ferrite are used for the contactless power transfer apparatus.

Here, an iron based amorphous core which is manufactured by Hitachi Metals, Ltd. is used as the amorphous core. Further, the number of windings of a primary side coil is set to be 24, the number of windings of a secondary side coil is set to be 9, and the magnetic gap is set to be 80 mm. Further, an aluminum plate for magnetic screening of 600×400×1 mm is mounted on rear surfaces of the primary side coil and the secondary side coil. Further, the both cores are set to have a magnetic gap of 80 mm. The mechanical gap is 70 mm in a ferrite core without a case and 80 mm in the amorphous core. Further, a frequency of the power supply is set to be 10 kHz, 15 kHz, 20 kHz, and 30 kHz when the measurement is performed using the amorphous core and set to be 20 kHz and 30 kHz when the measurement is performed using the ferrite core. The measurement is performed using an LCR meter by Agilent Technologies, Inc.

An equivalent circuit of the contactless power transfer apparatus is illustrated in FIG. 13.

When the amorphous core is used, a resistance r0 which indicates the iron loss is larger than that of the ferrite core but an error of r0 when the amorphous core is used is smaller. Further, the winding resistances r1 and r2 are larger than those of the ferrite core.

A maximum value (logical value) of the power transfer efficiency represented in the following equation (Equation (1)) may be obtained when the amorphous core is obtained without any difference from the value when the ferrite core is used.

$$\eta\max = \frac{1}{1+\frac{2r_2}{x_p}\sqrt{\frac{1}{b^2}\frac{r_1'}{r_2}+1}} \quad (1)$$

As a material of the amorphous core, an iron based amorphous metal which has been practically used in the pole transformer or a cobalt based amorphous metal which has an excellent high frequency property is used. Further, among these, amorphous which contains nano-crystal particles therein may be used.

Forth Embodiment

In a fourth embodiment, a structure in which a lead wire of the coil held in the case is led out will be described.

Figure 14:
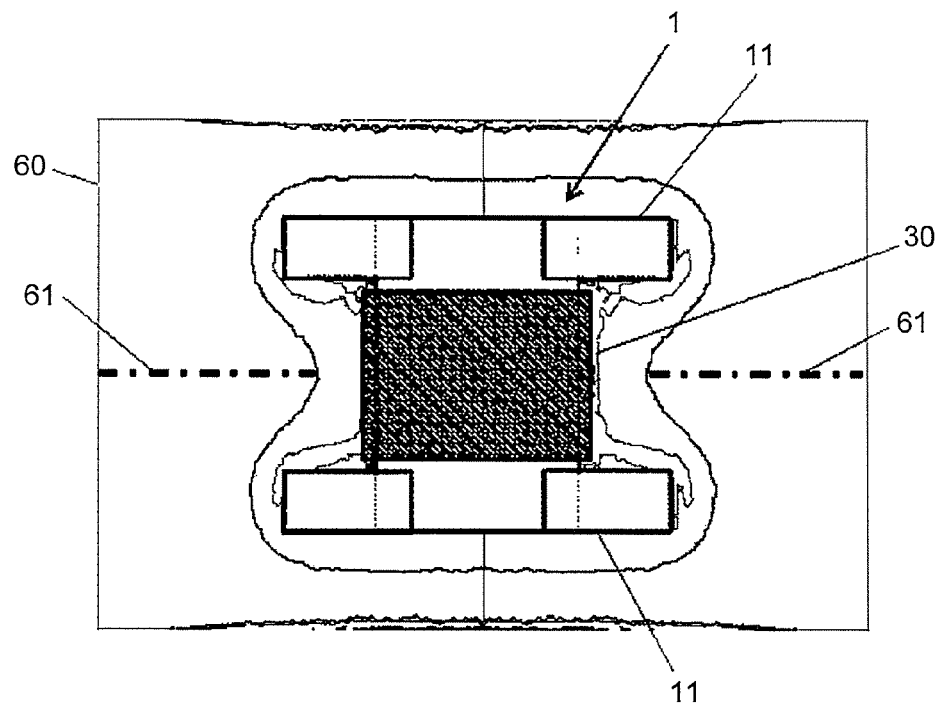
FIG. 14 is a diagram illustrating a loss in a shielding plate of a magnetic flux occurring from the H-shaped core.

FIG. 14 illustrates a result of analyzing a loss of the magnetic flux generated from the coil 1 due to the non-magnetic conductor plate 60 when the coil 1 in which the winding 30 is applied to the H-shaped core is arranged on the non-magnetic conductor plate 60 for magnetic screening.

Referring to FIG. 14, it is understood that, at the center portion between the parallel magnetic pole portions 11 and 11 of the H-shaped core (specifically, a position of a (imaginary) center line 61 which divides a spacing between the magnetic pole portions 11 and away from the winding portion 30), the distribution of the leakage magnetic flux is very small. It is more apparently understood that the leakage magnetic flux distribution is small at the center portion between the magnetic pole portions 11 and 11, from an experiment.

In the present invention, using this fact, the lead leading hole of the winding portion 30 provided in the non-magnetic conductor plate 60 is arranged near the center line 61 to lead out the lead wire without sacrificing the magnetic screening effect by the non-magnetic conductor plate.

Figure 15:
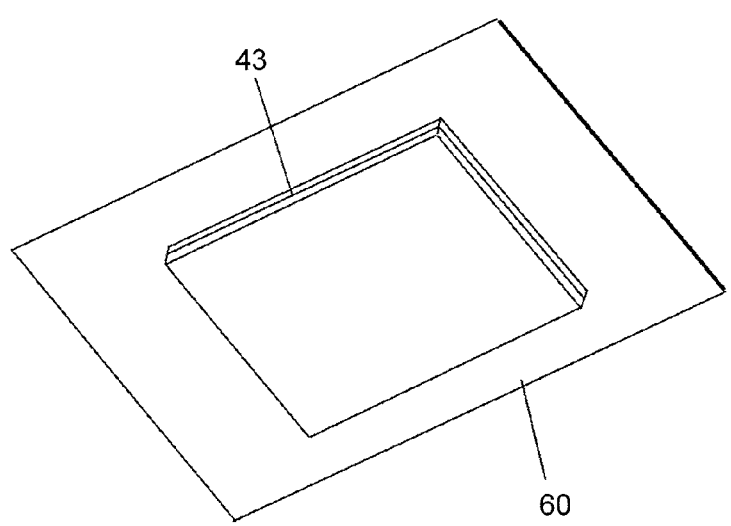
FIG. 15 is a diagram of an exterior appearance of a contactless power transfer system according to a fourth embodiment of the present invention.
Figure 16:
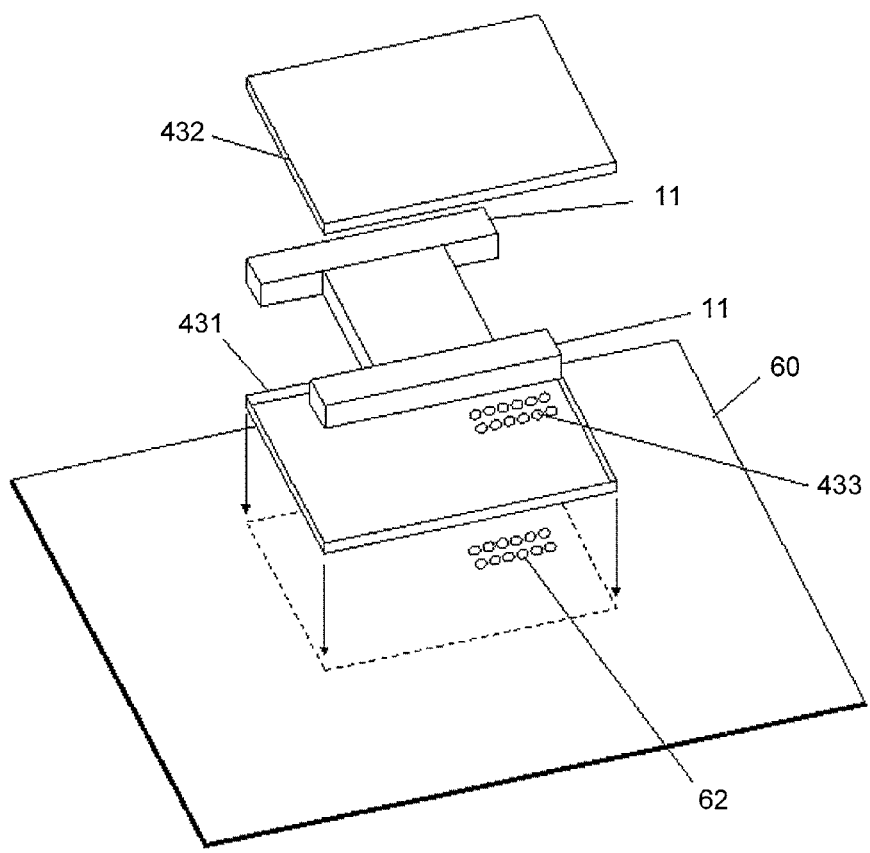
FIG. 16 is an exploded perspective view of the apparatus of FIG. 15.

FIG. 15 illustrates an exterior appearance (seen from the bottom) of the contactless power transfer apparatus in which the power reception coil is held, and FIG. 16 schematically illustrates the exploded perspective view thereof.

The apparatus includes: a case 43 in which a coil main body is held; and a non-magnetic conductor plate (aluminum plate) 60 for magnetic screening, to which the case 43 is fixed.

The case 43 is configured by a resin case main body 431 and a case cover body 432, the coil (in FIG. 16, only H-shaped core is illustrated and the windings are not illustrated) is held in the case main body 431, and the case cover body 432 is overlaid with the case main body 431 to be coupled thereto.

In the case main body 431, a case through hole 433 which leads the lead wire (litz wire) of the electric wire wound around the H-shaped core is provided. Six electric wires are wound around the H-shaped core in parallel (six parallel and six turns), so that total six pairs of case through holes 433 into which the lead wire of one end of each electric wire and the lead wire of the other end are inserted are formed in the case main body 431.

Figure 17:
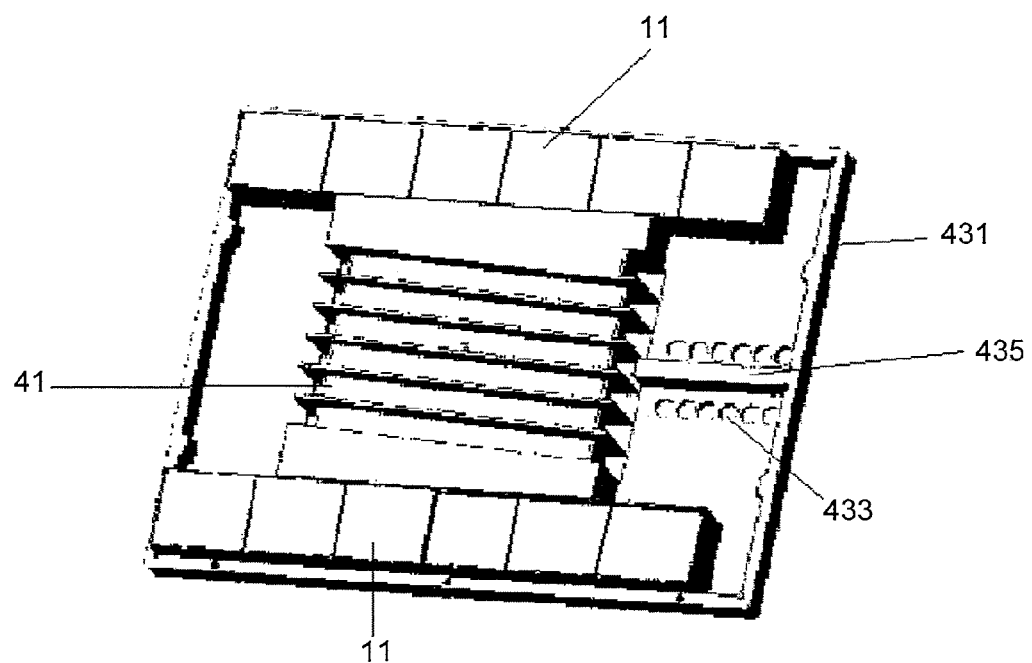
FIG. 17 is a diagram illustrating an H-shaped core which is held in a case of the apparatus of FIG. 15.

FIG. 17 illustrates the H-shaped core positioned to be held in the case main body 431. The H-shaped core includes a coil winding frame 41 around which six electric wires are wound in parallel, and a guide (winding partition) which allows the electric wires (litz wire) to be easily wound is provided in the coil winding frame 41 (coil not illustrated). The parallel magnetic pole portions 11 and 11 are configured by arranging a plurality of rectangular ferrite cores. A wound portion of the core which connects the center portions of the parallel magnetic pole portions 11 and 11 is arranged in the coil winding frame 41.

The case through holes 433 of the case main body 431 have a central convex (center line) 435 which divides the interval between the magnetic pole portions 11 and 11 into two parts interposed therebetween to form a pair at both sides of the central convex.

The non-magnetic conductor plate 60 is fixed to the case main body 431 such that a center position of the non-magnetic conductor plate overlaps a center position of the H-shaped core held in the case main body 431.

Figure 18:
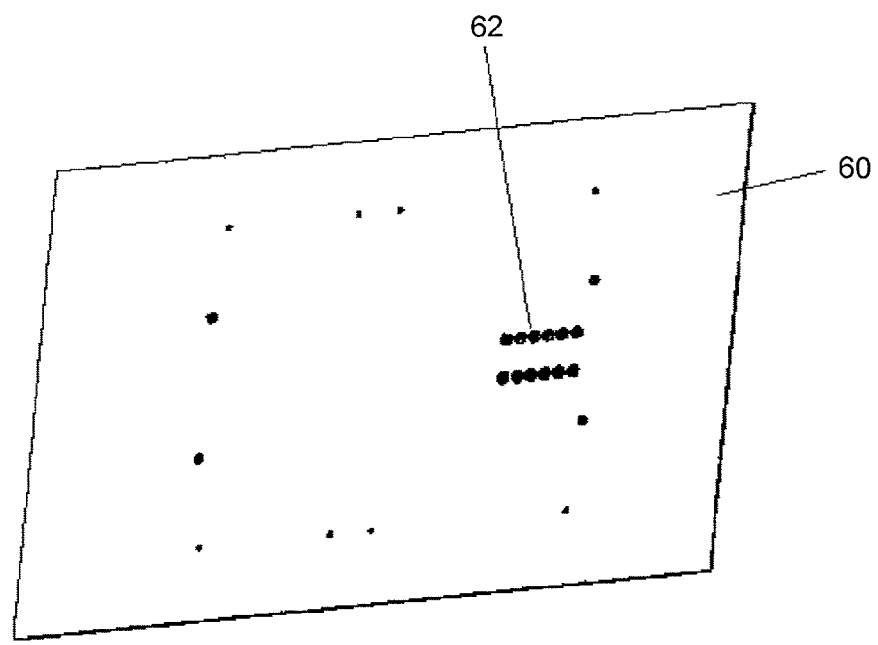
FIG. 18 is a diagram illustrating a non-magnetic conductor plate to which the case of FIG. 17 is fixed.

Further, in the non-magnetic conductor plate 60, a communicating through hole 62 is formed at a position communicating with the case through hole 433 of the case main body 431 (see FIG. 16). FIG. 18 illustrates independently the non-magnetic conductor plate 60 having the communicating through hole 62.

An area of the non-magnetic conductor plate 60 has a size so that substantially the entire area of the power transmission coil is placed below the non-magnetic conductor plate 60 even when the H-shaped core is arranged anywhere within a tolerable range of the misalignment.

Figure 19:
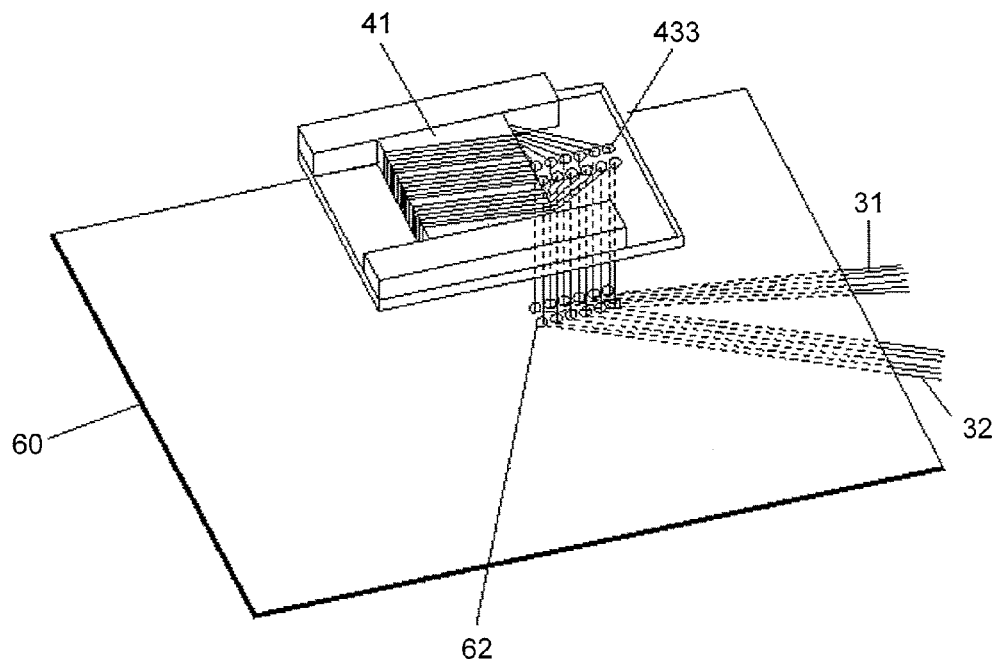
FIG. 19 is a diagram illustrating a lead-out status of a coil lead wire of the apparatus of FIG. 16.

As illustrated in FIG. 19, lead wires (litz wires) 31 and 32 of the electric wire which is wound around the coil winding frame 41 is led into the vehicle through the case through hole 433 of the case main body 431 and the communicating through hole 62 of the non-magnetic conductor plate 60.

Figure 20:
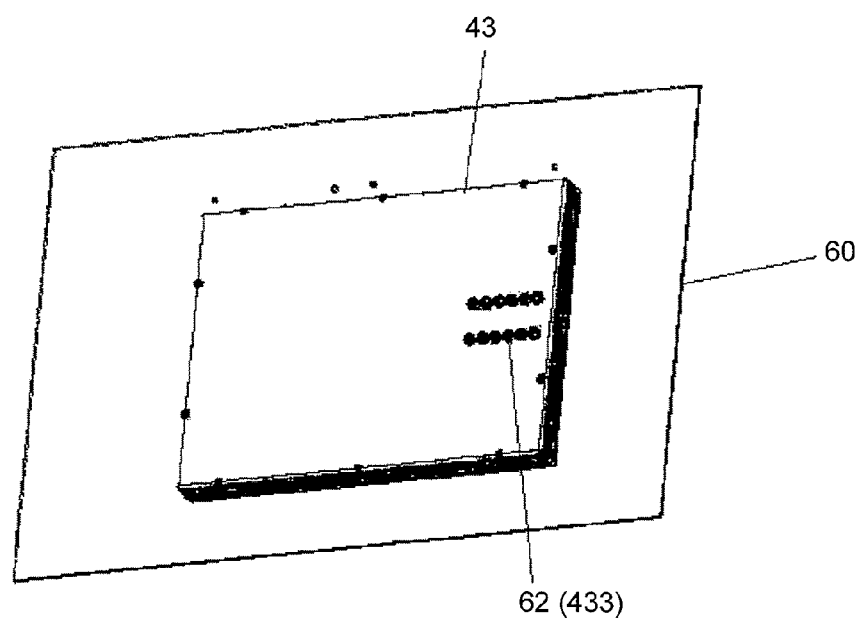
FIG. 20 is a diagram of the apparatus of FIG. 15 as seen from a non-magnetic conductor plate which is assumed to be transparent.

FIG. 20 illustrates the case 43 which is fixed to the non-magnetic conductor plate 60 as seen from the non-magnetic conductor plate 60 on an assumption that the non-magnetic conductor plate 60 is transparent.

In the contactless power transfer apparatus, the lead wires 31 and 32 of the winding which is wound around the H-shaped core is lead out from the hole (communicating through hole 62) provided to the non-magnetic conductor plate 60 so that the length of the lead wire is reduced as compared with the case when the lead wire detours the non-magnetic conductor plate 60.

Further, the position of the non-magnetic conductor plate 60 where the communicating through hole 62 is formed is in contact with the center position between the magnetic pole portions 11 and 11 of the H-shaped core and has small leakage magnetic flux distribution so that there is no concern that the leakage magnetic flux is leaked from the communicating through hole 62.

Therefore, the lead wire (litz wire) may be shortened without sacrificing the electric screening effect of the non-magnetic conductor plate 60.

Further, here, even though the six pairs of case through holes 433 are formed in the case main body 431, twelve case through holes may be formed at the center line dividing the spacing between the magnetic pole portions 11 and 11 into two parts, and lead wires of six parallel windings may be lead out from the holes. However, in this case, a distance between the H-shaped core and a case through hole which is the farthest case through hole from the H-shaped core is increased so that the size of the case 43 is increased. Therefore, in terms of a small-sized case 43, it is desirable to provide the case through holes 433 to form a pair.

Figure 21:
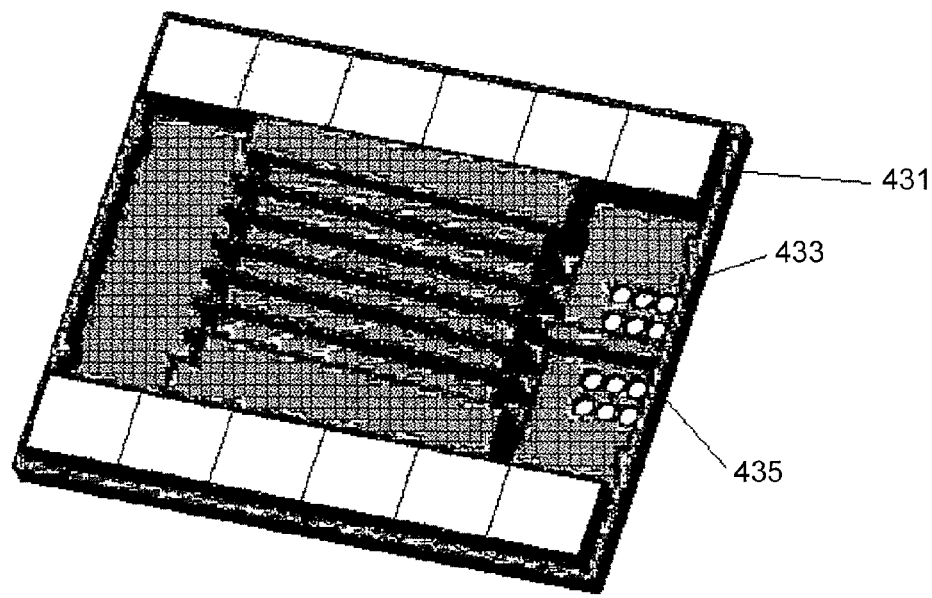
FIG. 21 is a diagram illustrating a contactless power transfer system in which two columns of case through holes are formed at the right and left of a center line, respectively.

Further, as illustrated in FIG. 21, two lines of case through holes 433 may be formed at both sides of the central convex (central line) 435 of the case main body 431, and the lead wires of the parallel windings may be leaded from the holes. In FIG. 21, six electric wires are wound around the coil winding frame in parallel, the lead wire at one end of each of the electric wires passes through the six case through holes 433 which are arranged in two lines at the left of the central convex 435 to be led out, and the lead wire at the other end of each of the electric wires passes through the six case through holes 433 which are arranged in two lines at the right of the central convex 435 to be led out. Therefore, the distance between the H-shaped core and the case through hole 433 which is the most separated from the H-shaped core is shorter than that of FIG. 17 and the case 43 may be small sized as much as the distance.

Figure 22:
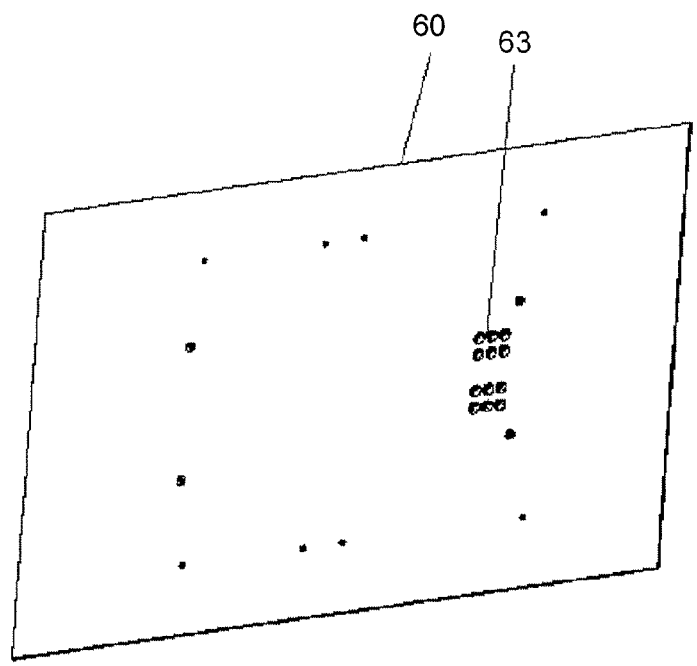
FIG. 22 is a diagram illustrating a non-magnetic conductor plate to which the case of FIG. 21 is fixed.

FIG. 22 illustrates the non-magnetic conductor plate 60 to which the case main body 431 of FIG. 9 is fixed. The position of the non-magnetic conductor plate 60 where the communicating through hole 63 is formed is in contact with the center position between the magnetic pole portions 11 and 11 of the H-shaped core and has small leakage magnetic flux distribution so that there is no concern that the leakage magnetic flux is leaked from the communicating through hole 63.

Therefore, the length of the lead wire may be reduced and the case 43 may be small sized without sacrificing the magnetic screening effect of the non-magnetic conductor plate 60.

Figure 23A:
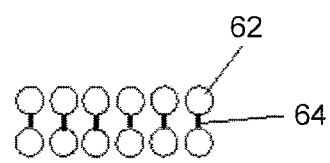
FIGS. 23A-23B are diagrams illustrating a communicating through hole of the non-magnetic conductor plate connected by a slit.
Figure 23B:
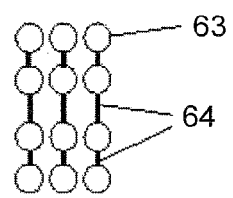

Further, as illustrated in FIGS. 23A and 23B, slits 64 may be provided between other communicating through holes and the communicating through holes 62 and 63 which are formed in the non-magnetic conductor plate 60.

The slit 64 blocks the eddy current which may be induced around the communicating through holes 62 and 63 of the non-magnetic conductor plate 60 to allow a high frequency current to flow into the lead wire. Therefore, the non-magnetic conductor plate 60 is prevented from being heated due to the eddy current.

Fifth Embodiment

In a fifth embodiment, a contactless power transfer apparatus in which the coil, the parallel resonance capacitor and the rectifying circuit are integrated with the non-magnetic conductor plate for magnetic screening interposed therebetween will be described.

FIG. 24A is a plan view of the contactless power transfer apparatus, and FIGS. 24B and 24C are side views thereof.

A case 43 holding the H-shaped core is fixed to one surface of the non-magnetic conductor plate 60, and a housing 45 in which a parallel resonance capacitor 134 and a rectifying circuit 140 (see FIG. 37) are held is fixed to a position corresponding to an opposite surface of the non-magnetic conductor plate 60.

The housing 45 is formed by aluminum. Because the housing 45 includes the rectifying circuit 140 which has a heat generating unit mounted therein, a cooling fin 451 is provided.

Figure 25:
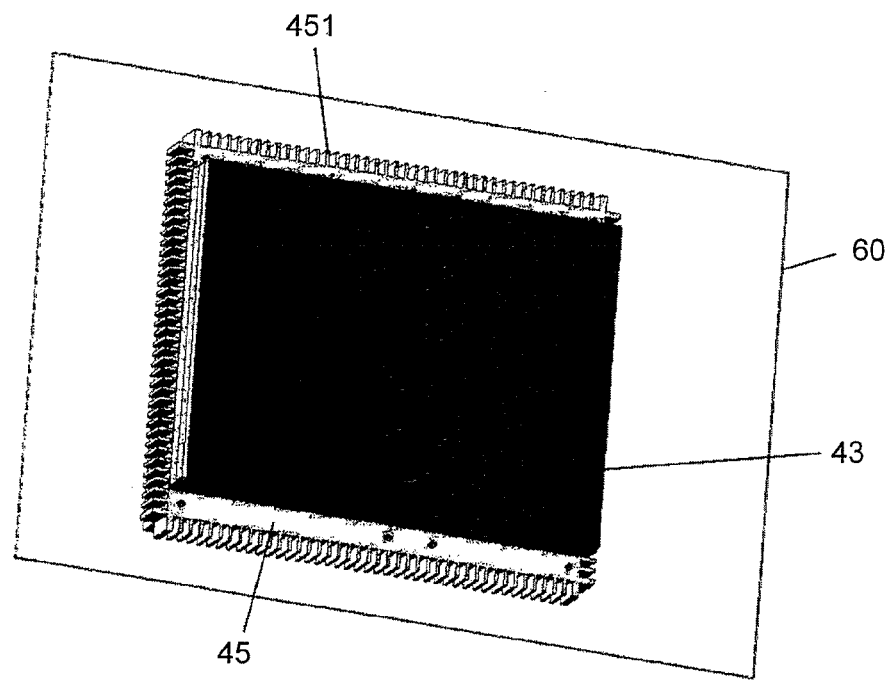
FIG. 25 is a diagram of the contactless power transfer system of FIGS. 24A-24C as seen from a side of the non-magnetic conductor plate where the case is fixed which is assumed to be transparent.

FIG. 25 illustrates the case 43 which is fixed to one surface of the non-magnetic conductor plate 60 and the housing 45 which is fixed to the opposite surface of the non-magnetic conductor plate 60 from the case 43 side on an assumption that the non-magnetic conductor plate 60 is transparent.

Figure 26:
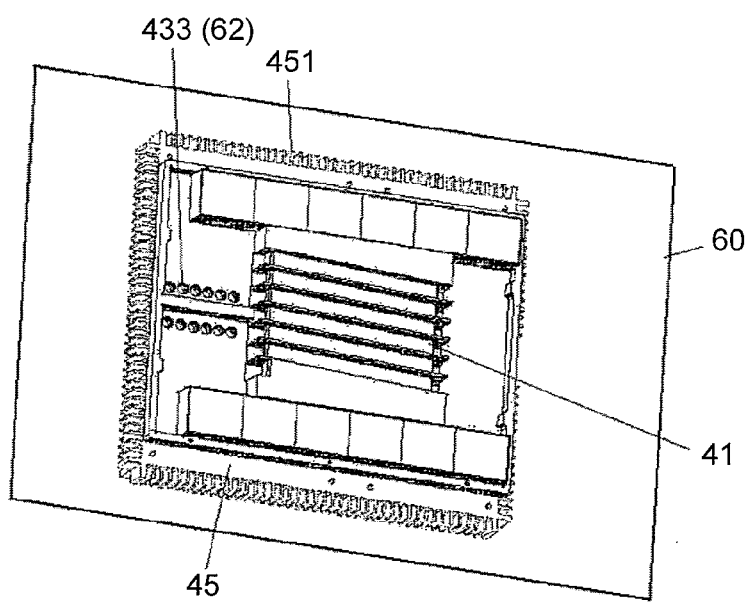
FIG. 26 is a diagram when a cover of the case of the apparatus of FIG. 25 is removed.

Further, FIG. 26 illustrates a state in which the case cover is removed so that the inside of the case main body 431 of the case 43 of FIG. 25 is illustrated. The case through hole 433 formed in the case main body 431 and the communicating through hole 62 formed on the non-magnetic conductor plate 60 so as to communicate with the case through hole 433 are formed at a position where the housing 45 is arranged, and the lead wire of the coil (not illustrated in FIG. 26) wound around the coil winding frame 41 is led into the housing 45 through the case through hole 433 and the communicating through hole 62, and electrically connected to the parallel resonance capacitor 134 in the housing 45.

With this configuration, the coil, the parallel resonance capacitor and the rectifying circuit are integrated with the non-magnetic conductor plate 60 interposed therebetween so that the lead wire (litz wire) of the coil may be shortened and the wiring line between the parallel resonance capacitor 134 and the rectifying circuit 140 mounted in the housing 45 is shortened.

Since the alternating current received at the secondary side of the power transformer is high frequency of several tens of kHz, it is practically important to connect the power reception coil 133 and the parallel resonance capacitor 134 illustrated in FIG. 37 and the parallel resonance capacitor 134 and the rectifying circuit 140 at a short distance, as much as possible. By doing this, it is possible to suppress the high frequency noise, reduce the thermal loss, and shorten the expensive litz wire, and small size and light weight of the coil device and the low cost may be achieved.

Now, here, even though it has been described that the parallel resonance capacitor and the rectifying circuit are held in the housing 45, another circuit which has a heating unit may be held in the housing 45. The housing 45 is formed of aluminum having a high thermal conductivity and has a thermal radiation fin 451 so that the temperature rise due to the heat generating unit may be avoided.

Further, here, even though the non-magnetic conductor plate formed of an aluminum plate for magnetic screening is used, a non-magnetic conductor plate formed of other material than aluminum may be used.

Further, here, it has been described that a plurality of electric wires are wound around the H-shaped core in parallel, but the winding electric wire may be one.

Sixth Embodiment

In a sixth embodiment, a configuration for improving a thermal radiation property of the contactless power transfer apparatus will be described.

As illustrated in FIG. 27, the apparatus includes a resin cover 46, and a fixing plate 47 fixed to the resin cover 46. The resin cover 46 and the fixing plate 47 form a housing of a double-sided winding coil.

The resin cover 46 has an opening at only one side such as like a measure. A step portion 461 for fixing the fixing plate 47 fitted therein is formed around the opening.

The fixing plate 47 is formed of an aluminum plate of a non-magnetic conductive metal member, and has a function of magnetically shielding the leakage magnetic flux of the double-sided winding coil and a function of radiating heat generated from the double-sided winding coil at the time of electrical conduction.

Further, in the fixing plate 47, a leading-out hole 471 which leads the end portion of the winding wounded around the winding section 12 of the H-shaped core 10 is provided. The position where the leading-out hole 471 is formed has been described in the fourth embodiment.

As illustrated in FIG. 28, the double-sided winding coil where the winding (not illustrated) is wound around the H-shaped core 10 is held in the resin cover 46 (FIG. 28A) and the fixing plate 47 is fixed to the opening of the resin cover 46 to manufacture the contactless power transfer apparatus (FIG. 28(b)). In the contactless power transfer apparatus, the fixing plate 47 is fixed to the floor of the vehicle such that the resin cover 46 of the housing faces the counterpart coil with a gap therebetween.

In this apparatus, the heat by the resistance loss of the winding of the double-sided winding coil is conducted to the fixing plate 47 and radiated from the fixing plate 47 so that the temperature rise of the contactless power transfer apparatus is suppressed.

Figure 29B:
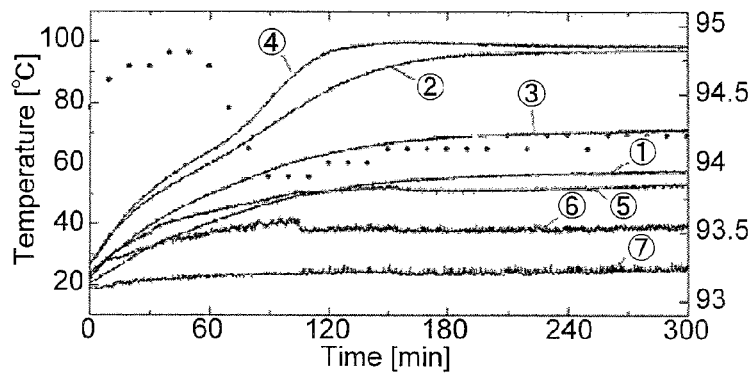
FIGS. 29A-29B are diagrams illustrating a temperature rise test result of the apparatus of FIG. 27.
Figure 29A:
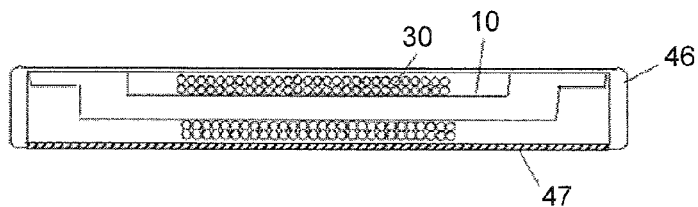

FIG. 29 illustrates a temperature change of each component when 3 kW continuous charging test is performed using the contactless power transfer apparatus. FIG. 29A illustrates a cross-sectional view of the contactless power transfer apparatus and FIG. 29B illustrates a temperature change of a primary side core (1), a secondary side core (2), a primary side winding (3), a secondary side winding (4), an aluminum fixing plate (5) of a secondary side case, an aluminum fixing plate (6) of the primary side case, and a room temperature (7) when the horizontal axis indicates a time (minute) and the left vertical axis indicates a temperature (° C.). Further, in FIG. 29B, the power transfer efficiency is indicated by a scale on a right vertical axis and the temporal change in the power transfer efficiency is denoted by block points.

Further, in this apparatus, the electric insulation of the winding 30 and the aluminum fixing plate 47 needs to be established. If the insulating coating is not performed on the winding 30, a gap is provided between the winding 30 and the aluminum fixing plate 47 or a thin insulating material is interposed therebetween to establish the insulation. In this test, a gap is provided between the winding 30 and the fixing plate 47 to establish the electrical insulation.

Figure 30B:
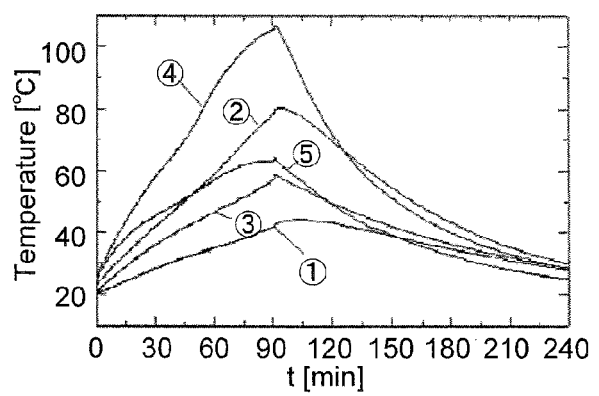
FIGS. 30A-30B are diagrams illustrating a temperature rise test result of a comparative embodiment.
Figure 30A:
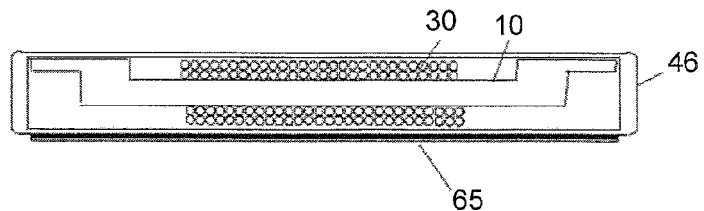

Further, FIG. 30 illustrates a measurement result when the coil is accommodated in the resin case 46 and the aluminum plate 65 is disposed so as to be in contact with the rear surface of the resin case 46 (a state illustrated in FIG. 30A) for the purpose of comparison. The measurement positions of (1) to (5) in the drawings are the same as those in FIG. 29. However, (5) represents a temperature of the aluminum plate 65 which is disposed on the rear surface of the secondary side resin case.

FIG. 30B illustrates a temperature change when 3 kW continuous charging is performed.

As obviously understood from the comparison of FIGS. 29B and 30B, in the contactless power transfer apparatus (the apparatus of FIG. 30A) having the resin case 46 as the housing, if the 3 kW continuous charging is performed, the temperature of the secondary winding continuously rises after 100° C. or higher but in the contactless power transfer apparatus (the apparatus of FIG. 29A) having the aluminum fixing plate 47 as the housing, the temperature of the secondary winding is saturated to be equilibrium status at approximately 100° C. It is understood that the power transfer efficiency of the contactless power transfer apparatus is 94% or higher and the aluminum fixing plate 47 serves as a leakage magnetic flux shielding material.

Further, when the continuous charging test of the device (comparative embodiment) of FIG. 30A is performed by lowering the power to 1.5 kW, a measurement result indicating that the saturated temperature of the secondary side winding and the secondary side ferrite core is approximately 60° C. and the continuous charging is available is obtained. However, if the power transmission coil is provided outside and an ambient temperature rises due to the irradiation of direct daylight, it is difficult to perform the continuous charging.

Further, the apparatus illustrated in FIGS. 28 and 29A introduces the high thermal conductive insulating resin in the case (housing) formed of the resin cover and the aluminum fixing plate to further improve the thermal radiation property.

The high thermal conductive insulating resin to be used is desirably an insulting resin and has a thermal conductivity of 0.9 W/mk or higher. The resin having such a performance is widely spread and for example, Si based resin such as SE4486 or SE4430 (which are manufactured by Dow Corning Toray Co., Ltd.) may be used.

Figure 31C:
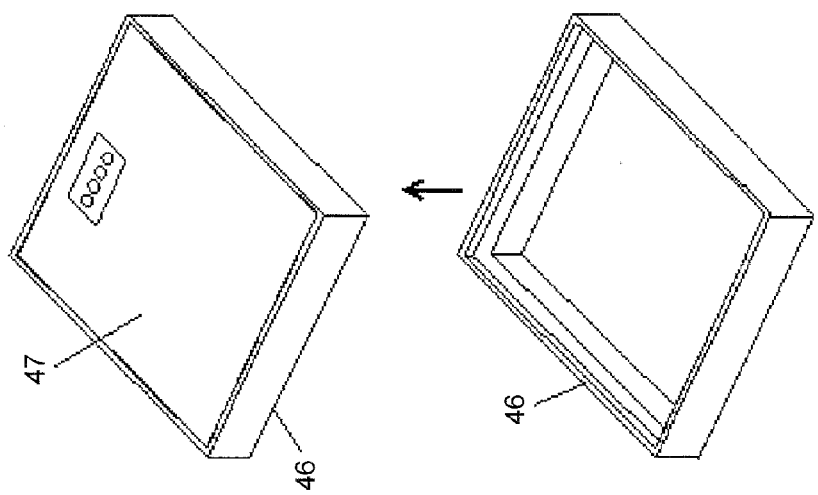
FIGS. 31A-31C are diagrams illustrating a manufacturing process of the contactless power transfer apparatus using a high thermal conductive insulating resin.
Figure 31B:
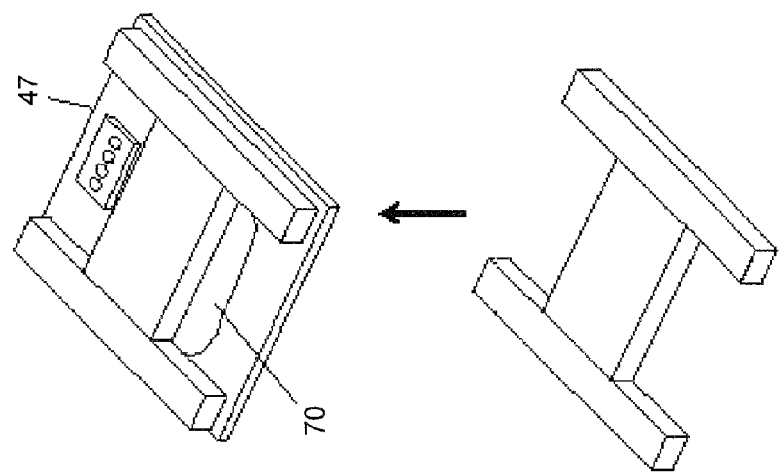
Figure 31A:
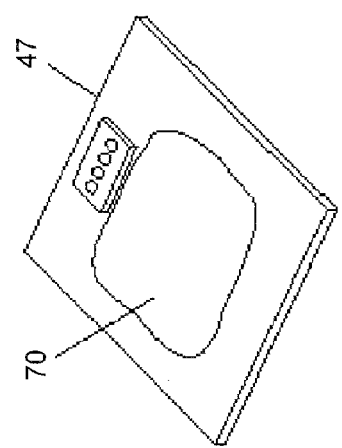
Figure 39:
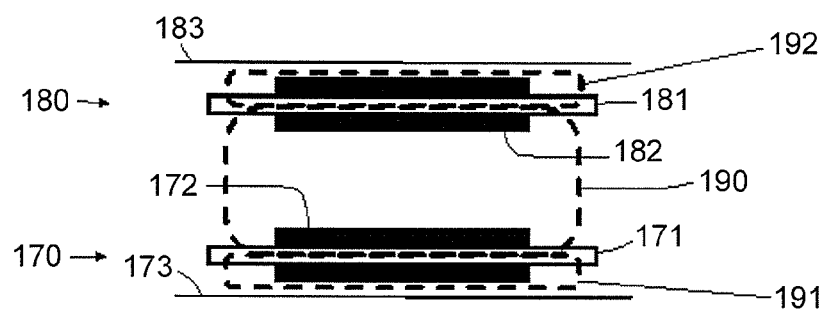
FIG. 39 is a diagram illustrating a magnetic flux of a contactless power transformer using a double-sided winding coil.
Figure 40:
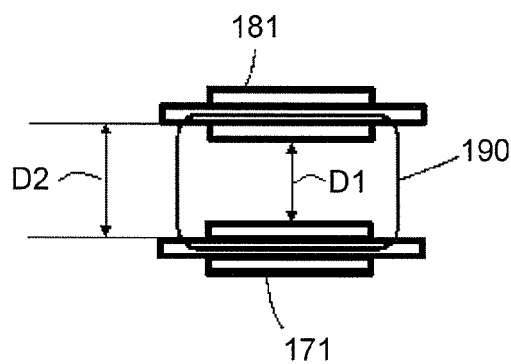
FIG. 40 is a diagram illustrating a mechanical gap length and a magnetic gap length of the contactless power transformer using the double-sided winding coil.

FIG. 31 illustrates a manufacturing process of the contactless power transfer apparatus. When the double-sided coil is held in the housing, the high thermal conductive insulating resin 70 is applied on a surface of the fixing plate 47 with which the double-sided winding coil is in contact in advance (FIG. 31A) and the double-sided winding coil is arranged thereon (FIG. 31B). The fixing plate 47 is fitted in the opening of the resin cover 46 with the double-sided winding coil arranged inside, and the contactless power transfer apparatus is manufactured (FIG. 31C).

FIG. 32 illustrates an actual manufacturing process. FIG. 32A illustrates a state in which the high thermal conductive insulating resin 70 is applied on a surface of the fixing plate 47 and FIG. 32B illustrates a state in which the double-sided winding coil is arranged thereon. FIG. 32C is an enlarged view of a portion which is enclosed by an ellipse of FIG. 32B and illustrates a part of the winding which is buried in the high thermal conductive insulating resin 70.

As described above, the thickness of the high thermal conductive insulating resin 70 is set to a thickness so that a portion of the winding of the double-sided winding coil is buried therein. When the double-sided winding coil is wounded around to form multiple layers, a thickness of the high thermal conductive insulating resin 70 is desirably set to a thickness so that at least one layer of the winding of the double-sided winding coil is buried in the high thermal conductive insulating resin 70.

In this contactless power transfer apparatus, the heat by the resistance loss of the winding of the double-sided winding coil passes through the high thermal conductive insulating resin 70 to be efficiently conducted to the fixing plate 47 and radiated from the fixing plate 47 so that the temperature rise of the contactless power transformer is efficiently suppressed.

FIG. 33 illustrates a temperature change of each component when 3 kW continuous charging test is performed using the contactless power transfer apparatus of FIG. 31. FIG. 33A illustrates a cross-sectional view of the contactless power transfer apparatus and FIG. 33B illustrates a temperature change of each component. Measurement data is the same as that of FIG. 29B.

As obviously understood from the comparison of FIGS. 33B and 29B, if the high thermal conductive insulating resin 70 is not filled between the winding 30 and the fixing plate 47, an equilibrium saturated temperature of the winding 30 is 100° C., but if the high thermal conductive insulating resin 70 is filled between the winding 30 and the fixing plate 47, an equilibrium saturated temperature of the winding 30 is lowered to be 60° C. Further, it is understood that the power transfer efficiency of the contactless power transfer apparatus is stably 94% or higher and the aluminum fixing plate 47 stably serves as a leakage magnetic flux shielding material.

Accordingly, the high thermal conductive insulating resin 70 is used to significantly improve the thermal radiation property (cooling property) of the contactless power transfer apparatus.

Further, here, even though it has been described that the high thermal conductive insulating resin 70 is filled between the winding 30 of the double-sided winding coil and the fixing plate 47 formed of the non-magnetic conductive metal material, as illustrated in FIG. 34, a high thermal conductive insulating resin 71 may be filled between the core 10 of the double-sided winding coil and the fixing plate 47.

In this case, heat generated in the core 10 due to the iron loss is efficiently conducted to the fixing plate 47 through the high thermal conductive insulating resin 71 and radiated from the fixing plate 47 so that the thermal radiation property is further improved.

Further, when the wound portion 12 of the core 10 is covered by the winding bobbin and the winding 30 is wounded around the winding bobbin, the winding bobbin may be molded by the high thermal conductive insulating resin.

By doing this, the heat generated in the core due to the iron loss and the heat generated in the winding due to the resistance loss are efficiently conducted to the fixing plate through the winding bobbin formed of the high thermal conductive insulating resin.

By doing this, the cooling insulating oil is introduced in the housing formed of the resin cover and the aluminum fixing plate to efficiently improve the thermal radiation property of the contactless power transfer apparatus.

As the cooling insulating oil, a mineral insulating oil such as a naphthenic insulating oil or a paraffinic insulating oil, or a synthetic oil such as a silicon oil or an alkyl benzene may be used.

In the contactless power transfer apparatus, the cooling insulating oil is enclosed in the housing. Natural convection is performed in the cooling insulating oil in the housing, and the heat generated in the core due to the iron loss and the heat generated in the winding due to the resistance loss are guided in the fixing plate 47 formed of the non-magnetic conductive metal material and thus the heat is radiated from the fixing plate 47.

In order to efficiently conduct the heat from the cooling insulating oil to the fixing plate, in this apparatus, as illustrated in FIG. 35, a plurality of protrusions 481 are formed on a surface (see FIG. 35B) of the fixing plate 48 which abuts against the inside of the housing and the surface area of the fixing plate 48 which is in contact with the cooling insulating oil is enlarged. Such protrusions 481 are formed by performing an embossing process on the aluminum plate.

However, if the protrusions 481 are formed on the fixing plate 48, the eddy current loss which may occur in the fixing plate 48 due to the leakage magnetic flux from the double-sided winding coil may be increased and thus the height or the area of the protrusion 481 needs to be set so as to limit the loss in a narrow range.

FIG. 36 illustrates a manufacturing process of the contactless power transfer apparatus. Here, the thermal radiation property may be improved by using the cooling insulating oil and also using a configuration which fills the high thermal conductive insulating resin between the double-sided winding coil and the fixing plate 48. FIG. 36A illustrates a fixing plate 48 in which protrusions are formed, FIG. 36B illustrates a resin case 46 and a double-sided winding coil which is fixed to the fixing plate 48 through the high thermal conductive insulating resin, and FIG. 36C illustrates a contactless power transfer apparatus manufactured by combining the resin case 46 in which the cooling insulating oil is injected and the fixing plate 48 to which the double-sided winding coil is fixed.

As described, by using the cooling insulating oil, the thermal radiation effect (cooling effect) of the contactless power transfer apparatus may be improved.

Specifically, both the high thermal conductive insulating resin and the cooling insulating oil are used to significantly improve the cooling effect of the contactless power transfer apparatus. The contactless power transfer apparatus may be used for 10 kW continuous charging.

Further, the area of the fixing plates 47 and 48 which are fixed to the opened surface of the resin case 46 may be set such that a periphery of the fixing plates 47 and 48 protrude from the resin case 46.

Further, here, even though the aluminum is used as the non-magnetic conductive metal material of the fixing plate, metal such as copper may be used.

INDUSTRIAL APPLICABILITY

The present invention may provide a contactless power transfer apparatus which may improve the power transfer efficiency and reduce the cost and encourage the introduction of the contactless power transfer apparatus to an electric vehicle or a plug-in hybrid vehicle.

REFERENCE SIGNS LIST

11 MAGNETIC POLE PORTION (FERRITE PLATE)
12 WOUND PORTION
13 LOWER FERRITE PLATE
14, 15 FERRITE PLATE
21, 22 AMORPHOUS CORE
221 FLAT PANEL SHAPE PART
222 BENT PART
223, 224 SEMI AMORPHOUS CORE BODY
30 WINDING PORTION
31, 32 LEAD WIRE
41 COIL BOBBIN
42 MAGNETIC POLE CASE
43 CASE
431 CASE MAIN BODY
432 CASE COVER BODY
433 CASE THROUGH HOLE
434 CASE THROUGH HOLE
435 CENTRAL CONVEX SHAPE (CENTER LINE)
45 HOUSING
451 COOLING FIN
46 RESIN COVER
461 STEP PORTION
47, 48 FIXING PLATE
471 LEADING-OUT HOLE
481 PROTRUSION

60 NON-MAGNETIC CONDUCTOR PLATE
61 CENTER LINE
62, 63 COMMUNICATING THROUGH HOLE
70, 71 HIGH THERMAL CONDUCTIVE INSULATING RESIN

The invention claimed is:

1. A contactless power transfer apparatus comprising:
one of a power transmission coil and a power reception coil opposing each other to perform contactless power transfer held in a case, wherein:
the power transmission coil or the power reception coil held in the case includes a core and an electric wire, the core having magnetic pole portions at both ends and a wound portion around which the electric wire is wound between the magnetic pole portions, the electric wire being wound around the wound portion of the core; and,
the magnetic pole portions of the core are formed from a pair of parallel magnetic members, the wound portion of the core is formed of a magnetic member which is perpendicular to the magnetic pole portions, and the core is formed in H-shape by the pair of magnetic members constituting the magnetic pole portions and the magnetic member constituting the wound portion; and,
with reference to a position of a wide core surface of the wound portion, at a side opposing a counterpart coil, a height of a face of the magnetic pole portions opposing the counterpart coil of the core is equal to or greater than a height of an outer circumference of the electric wire wound around the wound portion, and at a side not opposing the counterpart coil, a height of a core face is less than the height of the outer circumference of the electric wire wound around the wound portion.

2. The contactless power transfer apparatus of claim 1, wherein a length of a long side of a magnetic pole portion core member is larger than a length of a winding portion in the same direction.

3. The contactless power transfer apparatus of claim 2, wherein the power transmission coil or the power reception coil having the core of H-shape is held in the case formed by a resin, the case is fixed to a non-magnetic conductor plate for magnetic screening, a housing is arranged on an opposite face of a face of the non-magnetic conductor plate to which the case is fixed, and at least a capacitor which is connected to the coil in the case in parallel and a rectifying circuit are held in the housing.

4. The contactless power transfer apparatus of claim 3, wherein the case has a case through hole arranged near a center line which divides a spacing between the parallel magnetic pole portions of the core of H-shape into two parts, the non-magnetic conductor plate has a communicating through hole which overlaps the case through hole, and a lead wire of the electric wire wound around the wound portion of the core is inserted into the case through hole and the communicating through hole to be led into the housing and electrically connected to the capacitor and the rectifying circuit.

5. The contactless power transfer apparatus of claim 4, wherein the case through holes of the case are formed as a pair arranged to interpose the center line therebetween, and a lead wire connected to one end of the electric wire wound around the wound portion of the core and a lead wire connected to other end of the electric wire are inserted into the paired case through holes, respectively.

6. The contactless power transfer apparatus of claim 5, wherein the communicating through holes of the non-magnetic conductor plate which overlap the case through holes and formed as a pair are connected to each other by a slit.

7. The contactless power transfer apparatus of claim 5, wherein a plurality of electric wires are wound around the wound portion of the core in parallel, and a number of pairs of the case through holes arranged to interpose the center line of the case therebetween corresponds to the number of electric wires.

8. The contactless power transfer apparatus of claim 3, wherein an area of the non-magnetic conductor plate is larger than a contact area of the case with respect to the non-magnetic conductor plate, and the case is fixed to the non-magnetic conductor plate so that a center position of the held power transmission coil or the power reception coil matches with a center position of the non-magnetic conductor plate.

9. The contactless power transfer apparatus of claim 1, wherein the case has a space holding the power transmission coil or the power reception coil, the case includes a resin cover in which a face opposite the face facing the counterpart coil is open and a fixing plate fixed to the resin cover so as to close the opening of the resin cover, and the fixing plate is formed of a non-magnetic conductive metal material.

10. The contactless power transfer apparatus of claim 9, wherein a high thermal conductive insulating resin is interposed between the fixing plate and the electric wire wound around the wound portion of the core.

11. The contactless power transfer apparatus of claim 10, wherein the electric wire is wound around the wound portion of the core to form a multiple layers, and a thickness of the high thermal conductive insulating resin is set to a thickness so that at least one layer of the electric wire is buried in the high thermal conductive insulating resin.

12. The contactless power transfer apparatus of claim 10, wherein the high thermal conductive insulating resin is interposed also between the fixing plate and a part of the core other than the wound portion.

13. The contactless power transfer apparatus of claim 9, wherein the wound portion of the core is covered by a winding bobbin formed by the high thermal conductive insulating resin, and the electric wire is wound around the winding bobbin.

14. The contactless power transfer apparatus of claim 9, wherein a cooling insulating oil is enclosed in the case, and a protrusion for enlarging a contact area with respect to the cooling insulating oil is provided on a contact face of the fixing plate with respect to the cooling insulating oil.

15. The contactless power transfer apparatus of claim 14, wherein the protrusion is provided within a range so that eddy-current loss in the fixing plate due to the leakage magnetic flux from the coil does not exceed a predetermined amount.

16. The contactless power transfer apparatus of claim 1, wherein the wound portion of the core is formed of a laminated body in which a plurality of amorphous magnetic alloy ribbons are laminated, the magnetic pole portions of the core are formed by a ferrite, a laminated face of the laminated body is parallel to a surface of the wound portion from one of the magnetic pole portions to other one of the magnetic pole portions, and an end face of the wound portion at which the end faces of the ribbons appear abuts against the magnetic pole portions.

17. The contactless power transfer apparatus of claim 16, wherein the wound portion of the core is formed of the laminated body including a flat panel shape part and a bent part which is bent in a direction of the magnetic pole portions at an end edge side of the flat panel shape part which abuts against the magnetic pole portions.

18. The contactless power transfer apparatus of claim 16, further comprising:

a rectangular coil bobbin comprising an insertion hole into which the wound portion of the core is inserted; and two magnetic pole cases holding the magnetic pole portions of the core, respectively, wherein the wound portion is inserted into the insertion hole of the coil bobbin so as to expose the end faces, and the coil bobbin and the magnetic pole cases are coupled so that the end faces of the wound portion exposed from the insertion hole abuts against the magnetic pole portions held in the magnetic pole cases, respectively.

19. The contactless power transfer apparatus of claim 18, wherein the wound portion is formed from two laminated bodies comprising a flat plate shape part and a bent part which is bent in the direction of the magnetic pole portions at one end edge side of the flat plate shape part which abuts against the magnetic pole portions, and each of the laminated bodies is inserted from an opening at both sides communicating to the insertion hole of the coil bobbin so that distal ends of the flat plate shape parts abut against each other in the insertion hole as well as the bent part protrudes from the insertion hole, and end faces of the bent parts abut against the magnetic pole portions in the magnetic pole case, respectively.

* * * * *